(12) United States Patent
Tesar

(10) Patent No.: US 10,414,271 B2
(45) Date of Patent: Sep. 17, 2019

(54) MULTI-SPEED HUB DRIVE WHEELS

(71) Applicant: Delbert Tesar, Austin, TX (US)

(72) Inventor: Delbert Tesar, Austin, TX (US)

(*) Notice: Subject to any disclaimer, the term of this patent is extended or adjusted under 35 U.S.C. 154(b) by 0 days.

(21) Appl. No.: 15/866,459

(22) Filed: Jan. 9, 2018

(65) Prior Publication Data

US 2019/0023128 A1 Jan. 24, 2019

Related U.S. Application Data

(63) Continuation-in-part of application No. 14/195,847, filed on Mar. 3, 2014, now Pat. No. 9,862,263.

(60) Provisional application No. 61/771,438, filed on Mar. 1, 2013.

(51) Int. Cl.
| | |
|---|---|
| *B60K 17/04* | (2006.01) |
| *B60K 7/00* | (2006.01) |
| *B60K 17/08* | (2006.01) |
| *F16H 3/66* | (2006.01) |
| *B60B 35/12* | (2006.01) |
| *B60K 17/02* | (2006.01) |

(52) U.S. Cl.
CPC .......... *B60K 17/046* (2013.01); *B60B 35/125* (2013.01); *B60K 7/0007* (2013.01); *B60K 17/02* (2013.01); *B60K 17/08* (2013.01); *F16H 3/66* (2013.01); *B60K 2007/0038* (2013.01); *B60K 2007/0092* (2013.01); *F16H 2200/0034* (2013.01); *F16H 2200/2007* (2013.01); *F16H 2200/2033* (2013.01)

(58) Field of Classification Search
CPC ... B60K 7/0007; B60K 7/0061; B60K 7/0092
See application file for complete search history.

(56) References Cited

U.S. PATENT DOCUMENTS

| | | | |
|---|---|---|---|
| 276,776 | A | 5/1883 | Clemons |
| 341,389 | A | 5/1886 | Prescott |
| 386,168 | A | 7/1888 | Spencer et al. |
| 1,601,750 | A | 10/1926 | Wildhaber |
| 2,084,844 | A | 6/1937 | Harris |
| 2,750,850 | A | 6/1956 | Wildhaber |

(Continued)

FOREIGN PATENT DOCUMENTS

| | | |
|---|---|---|
| DE | 4226133 C1 | 12/1993 |
| DE | 4226133 A1 | 2/1999 |

(Continued)

OTHER PUBLICATIONS

Koran, Lucas and Tesar, D.; "Duty Cycle Analysis To Drive Intelligent Actuator Development;" May 2008; 14 pages.

(Continued)

*Primary Examiner* — Erez Gurari
(74) *Attorney, Agent, or Firm* — John A. Fortkort; Fortkort & Houston PC

(57) ABSTRACT

A multi-speed hub drive wheel is provided which includes a wheel equipped with a hub; a star compound gear train having first and second stages; a motor disposed in the hub which drives the wheel by way of the star compound gear train; and a clutch which switches the hub drive wheel between a first mode of operation in which the motor engages the first stage of the star compound gear train, and a second mode of operation in which the motor engages the second stage of the star compound gear train.

20 Claims, 34 Drawing Sheets

(56) References Cited

U.S. PATENT DOCUMENTS

| | | | | |
|---|---|---|---|---|
| 3,310,990 | A | 3/1967 | Zettel | |
| 3,371,552 | A | 3/1968 | Soper | |
| 3,705,522 | A | 12/1972 | Ogawa | |
| 3,709,055 | A | 1/1973 | Grove | |
| 3,729,276 | A | 4/1973 | Boyadjieff et al. | |
| 3,907,470 | A | 9/1975 | Harle et al. | |
| 4,095,150 | A | 6/1978 | Senckel | |
| 4,270,401 | A | 6/1981 | Davidson | |
| 4,367,424 | A | 1/1983 | Presley | |
| 4,389,586 | A * | 6/1983 | Foster | B60K 7/0007 310/67 R |
| 4,407,170 | A | 10/1983 | Fukui | |
| 4,474,275 | A | 10/1984 | Staedeli | |
| 4,505,166 | A | 3/1985 | Tesar | |
| 4,768,400 | A | 9/1988 | McKay | |
| 4,799,564 | A * | 1/1989 | Iijima | B60K 7/0007 180/65.51 |
| 4,846,018 | A | 7/1989 | Matsumoto et al. | |
| 4,922,781 | A | 5/1990 | Peiji | |
| 4,988,581 | A | 1/1991 | Wycliffe | |
| 5,102,377 | A | 4/1992 | Spanski | |
| 5,116,291 | A | 5/1992 | Toyosumi et al. | |
| 5,291,388 | A * | 3/1994 | Heinrich | B60L 11/1803 320/138 |
| 5,293,107 | A | 3/1994 | Akeel | |
| 5,355,743 | A | 10/1994 | Tesar | |
| 5,429,212 | A * | 7/1995 | Schlosser | B60K 7/0007 188/265 |
| 5,472,059 | A * | 12/1995 | Schlosser | B60K 7/0007 180/65.51 |
| 5,692,989 | A | 12/1997 | Kamlukin | |
| 5,704,864 | A | 1/1998 | Yanagisawa | |
| 5,721,473 | A * | 2/1998 | DeVries | B60K 6/48 318/139 |
| 6,119,542 | A | 9/2000 | Arbrink | |
| 6,276,475 | B1 * | 8/2001 | Nakanosono | B62M 6/65 180/65.8 |
| 6,367,571 | B1 | 4/2002 | Schwarz | |
| 6,672,966 | B2 | 1/2004 | Muju et al. | |
| 6,791,215 | B2 | 9/2004 | Tesar | |
| 6,948,402 | B1 | 9/2005 | Amendolea | |
| 6,991,580 | B2 | 1/2006 | Elser et al. | |
| 7,081,062 | B2 | 7/2006 | Tesar | |
| 7,122,926 | B2 | 10/2006 | Tesar | |
| 7,201,700 | B2 | 4/2007 | Buxton | |
| 7,431,676 | B2 * | 10/2008 | Tesar | B64C 13/34 475/163 |
| 7,500,935 | B2 * | 3/2009 | Waide | B64C 27/14 475/336 |
| 7,530,416 | B2 * | 5/2009 | Suzuki | B60K 7/0007 180/65.51 |
| 7,534,184 | B2 | 5/2009 | Tsurumi | |
| 7,552,664 | B2 | 6/2009 | Bulatowicz | |
| 7,553,249 | B2 | 6/2009 | Nohara | |
| 7,604,599 | B2 | 10/2009 | Fujimoto et al. | |
| 7,641,579 | B2 | 1/2010 | Junkers | |
| 7,722,494 | B2 | 5/2010 | Tesar | |
| 7,766,634 | B2 | 8/2010 | Liavas et al. | |
| 7,811,193 | B2 | 10/2010 | Nakamura | |
| 7,845,445 | B2 * | 12/2010 | Cooper | B60K 17/046 180/65.51 |
| 7,935,017 | B2 | 5/2011 | Kurita et al. | |
| 7,942,779 | B2 | 5/2011 | Kobayashi | |
| 7,976,420 | B2 | 7/2011 | Nakamura | |
| 8,022,564 | B2 | 9/2011 | Nohara et al. | |
| 8,029,400 | B2 | 10/2011 | Nakamura | |
| 8,033,942 | B2 | 10/2011 | Tesar | |
| 8,047,943 | B2 | 11/2011 | Nakamura | |
| 8,117,945 | B2 | 2/2012 | Nakamura | |
| 8,162,789 | B2 | 4/2012 | Takeuchi | |
| 8,235,856 | B2 | 8/2012 | Nakamura | |
| 8,308,599 | B2 | 11/2012 | Akami | |
| 8,323,140 | B2 | 12/2012 | Nakamura | |
| 8,353,798 | B2 | 1/2013 | Miyoshi et al. | |
| 8,382,629 | B2 | 2/2013 | Hirata | |
| 8,435,149 | B2 | 5/2013 | Koyama et al. | |
| 8,523,732 | B2 | 9/2013 | Le Moal | |
| 8,545,357 | B2 | 10/2013 | Hibino | |
| 8,790,204 | B2 * | 7/2014 | Gunji | B60K 7/0007 180/372 |
| 2003/0027681 | A1 | 2/2003 | Kakemo | |
| 2003/0085065 | A1 * | 5/2003 | Weisz | A61G 5/045 180/65.51 |
| 2003/0134707 | A1 * | 7/2003 | Goldie | B60K 7/0007 475/149 |
| 2004/0007406 | A1 * | 1/2004 | Laurent | B60K 7/0007 180/65.6 |
| 2004/0007923 | A1 | 1/2004 | Tesar | |
| 2004/0102274 | A1 | 5/2004 | Tesar | |
| 2004/0103742 | A1 | 6/2004 | Tesar | |
| 2004/0163869 | A1 * | 8/2004 | Chun | B60K 7/0007 180/209 |
| 2005/0168084 | A1 | 8/2005 | Tesar | |
| 2005/0221945 | A1 | 10/2005 | Plath | |
| 2006/0264292 | A1 | 11/2006 | Plath | |
| 2007/0078035 | A1 | 4/2007 | Oshidari | |
| 2007/0168081 | A1 | 7/2007 | Shin et al. | |
| 2007/0249457 | A1 | 10/2007 | Tesar | |
| 2008/0060473 | A1 | 3/2008 | Li | |
| 2008/0139357 | A1 | 6/2008 | Fujimoto | |
| 2008/0169141 | A1 * | 7/2008 | Suzuki | B60K 7/0007 180/65.7 |
| 2008/0236908 | A1 * | 10/2008 | Cooper | B60K 17/046 180/65.1 |
| 2008/0257088 | A1 | 10/2008 | Tesar | |
| 2008/0269922 | A1 | 10/2008 | Tesar | |
| 2008/0295623 | A1 | 12/2008 | Kurita et al. | |
| 2009/0075771 | A1 | 3/2009 | Tesar | |
| 2009/0118050 | A1 | 5/2009 | Takeuchi | |
| 2010/0113206 | A1 | 5/2010 | Wang et al. | |
| 2012/0083376 | A1 * | 4/2012 | Lo | B60K 1/04 475/149 |
| 2012/0088622 | A1 | 4/2012 | Tesar | |
| 2012/0204671 | A1 | 8/2012 | Tesar | |
| 2012/0215450 | A1 | 8/2012 | Ashok et al. | |
| 2013/0049498 | A1 | 2/2013 | Boughtwood | |
| 2013/0069462 | A1 | 3/2013 | Calvert | |
| 2013/0134839 | A1 | 5/2013 | Boughtwood | |
| 2013/0154406 | A1 | 6/2013 | Yun | |
| 2013/0175904 | A1 | 7/2013 | Jang et al. | |
| 2013/0193812 | A1 | 8/2013 | Oishi | |
| 2013/0214623 | A1 | 8/2013 | Yang et al. | |
| 2013/0217530 | A1 | 8/2013 | Tesar | |
| 2013/0218436 | A1 | 8/2013 | Kirby | |
| 2013/0293181 | A1 | 11/2013 | Lee et al. | |
| 2013/0242039 | A1 | 12/2013 | Umemori et al. | |
| 2013/0319145 | A1 * | 12/2013 | Shimada | B60K 7/0007 74/89.16 |
| 2013/0342040 | A1 | 12/2013 | Umemori et al. | |
| 2014/0015382 | A1 | 1/2014 | Kim | |
| 2014/0048345 | A1 | 2/2014 | Trueman | |
| 2014/0224064 | A1 * | 8/2014 | Tesar | H02K 7/116 74/606 R |
| 2014/0228162 | A1 * | 8/2014 | Tesar | F16H 1/28 475/331 |
| 2014/0246893 | A1 * | 9/2014 | Tesar | B60K 7/0007 301/6.5 |

FOREIGN PATENT DOCUMENTS

| | | |
|---|---|---|
| EP | 0058025 A1 | 8/1982 |
| EP | 0527483 A2 | 2/1993 |
| EP | 2149724 A1 | 2/2010 |
| EP | 2169263 B1 | 3/2010 |
| GB | 008203 | 4/1903 |
| GB | 224449 | 11/1924 |
| GB | 419171 | 11/1934 |
| GB | 426136 | 3/1935 |
| GB | 450246 | 7/1936 |
| GB | 676894 | 8/1952 |
| GB | 759185 | 10/1956 |
| GB | 775629 | 5/1957 |

(56) References Cited

FOREIGN PATENT DOCUMENTS

| | | |
|---|---|---|
| GB | 856486 | 12/1960 |
| GB | 926760 | 5/1963 |
| GB | 1083689 | 9/1967 |
| GB | 1104250 | 2/1968 |
| GB | 1176936 | 1/1970 |
| GB | 1179105 | 1/1970 |
| GB | 1409651 | 10/1975 |
| GB | 1453135 | 10/1976 |
| GB | 1453135 A | 10/1976 |
| GB | 1494895 | 12/1977 |
| GB | 2014260 A | 8/1979 |
| GB | 2377740 A | 1/2003 |
| GB | 2387882 A | 10/2003 |
| GB | 2489503 A | 10/2012 |
| WO | 96/04493 A1 | 2/1996 |

OTHER PUBLICATIONS

Rabindran, Dinesh et al.; "A Differential-Based Dual Actuator For A Safe Robot Joint: Theory And Experiments"; World Automated Congress (WAC); Aug. 2014; 6 pages.

Koran, Lucas et al.; "Duty Cycle Analysis To Drive Intelligent Actuator Development"; IEEE Systems Journal; May 2008; 14 pages.

Kulkarni, Amit Vijay; Dissertation entitled: "Instant Center Based Kinematic and Dynamic Motion Synthesis for Planar Mobile Platforms;" The University of Texas at Austin; Dec. 2009; 351 pages.

Ghionea, Adrian et al.; "Utilization of Some Computer Assisted Techniques in Generating and Study of the Hypocycloidal Flanks of the Spur Gear Teeth Stress"; 5th International Meeting of the Carpathian Region Specialists in The Field of Gears; May 2004; 8 pages.

Jones, Chris M. Sr.; "'Real-Time' Travel: A Strategy for Distributed Synchronized Actuator Control Using Open Standards"; Naval Engineers White Paper; 9 pages.

Ting, Yung et al.; "A Control Structure for Fault-Tolerant Operation of Robotic Manipulators"; Research Paper; University of Texas at Austin, Department of Mechanical Engineering; Apr. 1993; 10 pages.

Tesar, Delbert et al.; "Test-Bed to Measure the Performance Criteria of Actuators"; Robotics Research Group, University of Texas at Austin, 2002 Deliverable for Thread 3: High Performance Envelope Based on Intelligent; Dec. 1, 2001; 14 pages.

Townsend, Dennis P.; "A Comparison of the Double-Circular-Arc-Gear Drives With Standard Involute Gear Drives"; Abstract; www.pumpjack.com/downloads; 8 pages.

Litvin, Faydor L. et al.; "Helical Gears With Circular Arc Teeth: Generation, Geometry, Precision and Adjustment to Errors, Computer Aided Simulation of Conditions of Meshing, and Bearing Contact"; NASA Contractor Report 4089; AVSCOM Technical Report 87-C-18; Oct. 1987; 95 pages.

Krishnamoorthy, Ganesh et al.; "Multi-Sensor Architecture for Intelligent Electromechanical Actuators"; 12th IFToMM World Congress, Besancon, France; Jun. 18-21, 2007; 6 pages.

Lim, Gee Kwang et al.; "Modeling and Simulation of a Stewart Platform Type Parallel Structure Robot"; Final Report, Grant No. NAG 9-188; The University of Texas at Austin, Mechanical Engineering Department; Apr. 1989; 216 pages.

Lee, Hoon et al.; "An Analytical Stifness Analysis Between Actuator Structure and Principal Bearings Used For Robot Actuators"; Proceedings of ASME 2011 International Design Engineering Technical Conference and Computers and Information in Engineering Conference; IDEC/CIE 2011; Aug. 29-31, 2011; Washington, D.C.; 10 pages.

Knight, W.; "The Robots Running This Way"; MIT Technology Review; 2014; 8 pages.

Ashok, Pradeepkumar et al.; "Guidelines for Managing Sensors in Cyber Physical Systems with Multiple Sensors"; Research Article; Hindawi Publishing Corporation, Journal of Sensors; vol. 2011, Article ID 321709; Nov. 22, 2011;16 pages.

Hvass, Paul Brian et al.; "Condition Based Maintenance for Intelligent Electromechanical Actuators"; Research Paper; Jun. 2004; 262 pages.

Kang, Seong-Ho et al.; "Indoor GPS Metrology System with 3D Probe for Precision Applications"; ASPE.pointinspace.com/publications/annual_2004 Papers; 2004; 4 pages.

\* cited by examiner

MULTI-SPEED VEHICLE DRIVE WHEELS

I. EFFICIENCY REGIME
- Tune I.C. Engine
  - Constant Speed
  - More Efficient
  - Peak Power

- More Local Contacts
  - Drive Energy Wheel
  - Operate at Higher Speeds
  - Increase Tire Pressure
  - Maximize Safety
  - Address Weather Conditions

- Operator Oversight
  - Multiple Strategies
  - System Performance Maps
  - Real Time Feedback
  - Durability/Maintenance
  - Performance Reserve II. ACCELERATION REGIME
- Maximize Torque
  - Lower Speeds
  - Climbing
  - Rough Terrain
  - Maximize Traction III. REQUIRES MULTI-SPEED DRIVES
- Two Lower Speeds
  - High Gear Ratio
  - Power Supply Config. 1
  - Maximum Maneuverability

- Two Upper Speeds
  - Low Gear Ratio
  - Power Supply Config. 2
  - Durability at Speed
  - Efficiency at Speed

*FIG. 9*

HUMAN CHOICE

I. RESPOND TO CUSTOMER
- Drivability
  - Acceleration
  - Emergency Maneuvers
  - Braking

- Efficiency
  - Urban Operations
  - Highway Oper.
  - Smoothness

II. VEHICLE COST

- Standardized Components
  - Tuned Engine/Generator
  - Batteries/Inverters/Ultracaps
  - Low Cost MDW's

- Minimum Set of Components
  - Assemble Car on Demand
  - Responsive Supply Chain
  - Highly Certified/Proven

III. OEM LIFE CYCLE SUPPLY
- At Time of Purchase
  - Drivability/Efficiency
  - Demand Cycles
  - Future Upgrades

- Repairs/Upgrades
  - OEM Priorities/Sales
  - OEM Controls Supply Chain
  - Continuous Tech Modernization

IV. DURABILITY VS. COST
- Customer Wants Durability
  - High-End MDW Modules
  - Careful Software Management
  - CBM/Remaining Useful Life

- Customer Wants Low Cost
  - Low-End MDW Modules
  - Rapid Module Changeovers
  - 5000 Hour Life for MDW

*FIG. 10*

PROTEAN-APPARENT SIMPLICITY

I. LOW LEVEL OF RUGGEDNESS
- Small Diameter Bearings
  - Low Shock Resistance
  - High Deformations
- Large Diameter Air Gap
  - Critical Oper. Dimension
  - Produces High Torque
  - Tolerance/Temp. Sensitive
- Rare Earth Magnets
  - Sensitive to Shock, Temp.
  Wheel       Alignment
  - Future Cost/Availability Is Uncertain II. UNIQUE BRAKE PROBLEMS
- Standard EVB
  - Attach to Rotor
- No Emergency Brake
  - Parking on Slope Difficult III. OEM LIFE CYCLE SUPPLY
- One Efficiency Map
  - Good For Limited Duty Cycles
  - Efficiencies Below 70%(?)
  - Future Upgrades
- One Drivability Class
  - Aggressive vs. Quiet
  - Safety vs. Maneuverability
- Excellent Control Reconfigurability
  - One Inverter per Phase
  - High Fault Tolerance IV. High Torque Density
- High End Design
  - Aluminum Bell Housing
  - Cost Reduction Unlikely
  - Requires Cooling
- Brushless D.C. Motor
  - Requires Versatile Inverter
  - Provides Quiet Operation

*FIG. 11*

MDW – BASIC PROPERTIES
(Expands Human/Operator Choices)

I. FOUR BASIC SPEEDS
   - Two Mechanical Speeds
     - 14 to 1 and 49 to 1
   - Two Electrical Regimes
     - Drivability
     - Efficiency II. Exceptional Ruggedness
   - One Principal Bearing
     - High Stiffness
   - Other Bearings
     - Low Diameter
     - Low Friction
     - Held in Rigid Structure
   - Separate SWR Module
     - Shock Isolated
     - Compact Spherical Shape III. POTENTIAL FOR LOW COST
   - All Components Are Standard
     - Small Bearings
     - Helical Gear Teeth
     - 5000-hour Durability
   - Standardized Shell/Assembly
     - Shell Is Hub Structure
     - Direct Suspension Attachment
     - Brake Attached To Output Plate
     - Emergency Brake On Motor
   - SRM- Lowest Possible Cost
     - No Magnets
     - Simple Wiring In Stator
     - Rotor Uses Simple Laminates
     - Highly Flexible Control
     - Continuous Software Upgrades Feasible

*FIG. 15*

RUGGEDNESS – NOT AN AFTERTHOUGHT
(Durability/Shock Resistance First Priority)

I. SIMPLIST POSSIBLE GEAR TRAIN
- Star Compound
  - No Moving Cage
  - Low Inertia
  - Bearings in Fixed Frame
- One Principal Bearing
  - Cross Roller Bearing
  - 6x Times Stiffer
  - Low Weight/Volume
  - Bearing For Wheels II. FULL DESIGN PROCESS
- Controls All Parameters
  - Visual Design Maps
  - Refined Specification Mgmt.
- Fully Interactive
  - Designs in Minutes
  - Permits Continuous Review III. GEAR TRAIN RUGGEDNESS
- Short Force Path
  - Reduces Effects of Tolerances, Deformations, Temperature
  - Provides Exceptional Stiffness
  - Reduces Weight/Volume IV. CLUTCH DESIGN
- All Gears Always In Mesh
  - No Synchronization
- Pure Mechanical
  - Speed Synchronization Necessary
  - Preloaded Balls
  - Solenoid Locking
- Some Complex Assembly
  - Small Components
  - Low Duty Cycles

*FIG. 16*

WHY THE SRM (Switched Reluctance Motor)?
(Exceptional Simplicity/Low Cost/Ruggedness)

I. GREAT SIMPLICITY
   - Laminated Stator
     - 6/4 up to 12/8 Phases
     - Various Levels of Torque, Efficiency/Losses
     - Wiring is Important
     - Laminates (0.008" to 0.020")
     - Various Materials Choices
   - Laminated Rotor
     - Multiple Poles
     - High RPM Necessary
     - Small Diameter
     - Low Centrifugal Stresses
     - Requires Rugged Shaft and Bearings II. SEPARATE COMPACT MODULE
   - Plug-On Unit
     Spline To Gear Train,
   - Rugged Bearings/Shell
     - Protect Air Gap
   - Available In Five Sizes ?
     - 16, 20, 24, 32, 40, H.P.
     - Two Diameters/Three Lengths

III. TWO BASIC GEAR TRAIN SIZES
   - Two Basic Shell Sizes
   - Small for 16, 20, 24, H.P.
     - Change Gears
     - Emphasis On Efficiency
   - Large for 32, 40, H.P.
     - Uses Higher Quality Materials and Manufacture
     - Emphasis on Drivabilty

*FIG. 17*

MDW DEVELOPMENT GOALS
(Always Respond To The Customer)

I. CUSTOMER PAYS OEM
   - Multiple Suppliers

II. OEM GETS MORE OF LIFE CYCLE COSTS
   - Repair
   - Refreshment

III. MAXIMIZE CUSTOMER CHOICE
   - At Time of Purchase
   - Future Repairs
   - Future Upgrades
   - Constant Reinvestment IV. PERSONAL COMPUTER MODEL
   - Michael Dell   - Chrysler
   - Intel          - Borg
     Warner
   - Microsoft      - UT Spinoff V. AGGRESSIVE SUPPLY CHAIN
   - In-depth Certification
   - Constant Upgrades
   - Minimum Set
   - Standard For Investment VI. STAY AHEAD OF COMPETITORS
   - Continuous Tech Development
   - Hold Results In Reserve
   - Continuous Performance/Cost
   - Market Efficiency
   - Market Drivability
   - Invite Third Party Suppliers
   - Maintain Tech Balance

*FIG. 18*

Marketing Strategy

V. MAXIMIZE HUMAN CHOICE
VI. CONTINUOUS REVIEW OF BASIC CUSTOMER NEEDS
  - Efficiency, Drivability, Cost
VII. CONTINUOUS REVIEW OF DUTY/DEMAND CYCLES
VIII. SPECIFIC CUSTOMER DEMAND CYCLE EVALUATION
  - Quantifies Customer's Real Needs
IX. CONTINUOUS PERFORMANCE/COST IMPROVEMENT
X. CONTINUOUS TECH IMPROVEMENT/TESTING
  - Clutch. Gear Train, Motor, Brakes, Controller, Etc.
XI. CONTINUOIUS OPERATIONAL SOFTWARE DEVELOPMENT
  - Road Surface Condition/Weather
  - Respond to Human Commands
  - Emergency Maneuvers
XII. HOLD ADVANCES IN RESERVE
  - Permits Rapid Response To Market Changes
  - Stay Ahead of the Competition

*FIG. 19*

Short-Force Path

1. Ensures High Stiffness
   - Reduced Internal Deformation
   - Reduced Tolerance Buildup
   - Reduced Temperature Effects 2. Use Stiff Principal Bearing
   - Cross Roller Bearing
   - Double Row Tapered Bearing
   - Resists Forces in All Directions
   - Acts to Support Gears
   - Acts as Machine Joint
   - Key to Actuator Integrity 3. Backbone Is Central Structure
   - Reinforces Shell Structure
   - Stiffness Short Force Path
   - Enables Solid Frame Attachment 4. Enhances Torque Density
   - Smaller/Lighter Actuators
   - Internal Bull Ring Gear
   - Ruggedness/Durability
   - Shock Resistance 6. Enables Metrology
   - As-Built Parameters
   - Required Precision
   - Geometry/Dimensions
   - Deformation Coefficients
   - Temperature Coefficients
   - Embedded Parameters
   - Download to System Controller
   - Real Time Error Compensation

*FIG. 22*

Clutch Mechanism for Two-Speed MDW
(Simplicity, Volume, Weight, Durability, Cost, Etc.)

I. TWO SPEED REQUIREMENT
- Drivability
  - Acceleration
  - Climbing
  - Emergency Response
- Efficiency/Durability
  - Lower Fuel Use
  - Temperature Management
  - Reduce Noise Levels II. HIGH SPEED REQUIREMENT(70 mph)
- Motor RPM Up To 15,000
  - Extreme Inertia Forces
  - Down Shift at Any Speed
  - Zero Torque Shift
- Engage at 5,000 RPM
  - Match Wheel/Motor Speeds
  - Speed Sensors Required
  - From 14-to-1 To 45-to-1

III. SHIFT DISK/ENGAGING BALLS
- Splined To Motor Shaft
  - Engages 1st Stage Pinion
  - Engages 2nd Stage Pinion
  - Gears Are Always In Mesh
- Push Rod Operates Disk
  - Spoked End Plate
  - Driven By BDC Shift Motor
  - 20-to-1 Screw Reduction
  - Intermediate Neutral IV. TWO SETS OF BALLS (6?)
- Balls Engage Matching Sockets
  - Disengage At Any Speed
  - Engage At Matched Speeds
  - Balls Are Forgiving
- Balls Held By Ring Cage
  - Preload By Bellvue Washer
  - Magnetic or Wedge Clamp

*FIG. 23*

- Basic Parameters
  - Ratio 1: $g_h = \frac{r_5 r_7}{r_6 r_8}$
  - Ratio 2: $g_l = \frac{r_1 r_3 r_5 r_7}{r_2 r_4 r_6 r_8}$
- Shift Disk Concept
  - Slides on Shaft Spline
  - Does Not Rotate
  - Gear Shafts Pass Through
  - Moves Dual Friction Cone
- Clutch Operation
  - Neutral in Central Position
  - Engages Face Gears in Gears $r_1$ and $r_4$
  - $g_h$ when $r_4$ is driven
  - $g_l$ when $r_1$ is driven

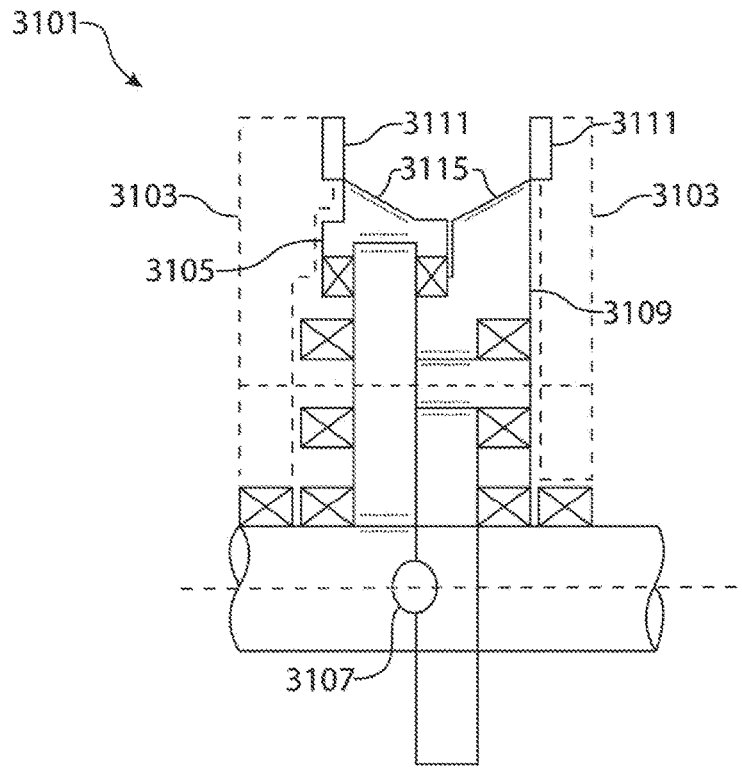

- Ring Gear bearing Support
  - Bearings on Cage
  - Dual Symmetric Support
- Cage Bearing Support
  - Bearings on Central Shaft
  - Shell Holds Shaft bearings
- Basic Parameters
  - Set 1: $g^c_{4/1} = 37.9$; $g^r_{4/1} = 9.3$; $\bar{g}_{4/1} = 4.08$
  - Set 2: $g^c_{4/1} = 12.9$; $g^r_{4/1} = 4.33$; $\bar{g}_{4/1} = 3.0$
- Design Constraint
  - $\frac{r_4}{r_3} < 7.0$
- Inertia Content
  - Ring/Cage Very Low
  - Amplified Gear $\left(\frac{r_3}{r_1}\right)$ is Key
  - Inertia is $\left(\frac{r_3}{r_1}\right)^2$ Less Than Motor Inertia Content

MULTI-SPEED HUB DRIVE WHEELS

CROSS-REFERENCE TO RELATED APPLICATION

This application is a continuation-in-part application which claims the benefit of U.S. Ser. No. 14/195,847, having the same title, and the same inventor, and which is incorporated herein by reference in its entirety, and which claims priority to U.S. provisional application No. 61/771,438, filed Mar. 1, 2013, having the same title, and the same inventor, and which is incorporated herein by reference in its entirety. This application also claims the benefit of priority from U.S. provisional application No. 61/889,612, filed Oct. 11, 2013, having the title "GEAR TRAIN AND CLUTCH DESIGNS FOR MULTI-SPEED HUB DRIVE WHEELS", and having the same inventor, and which is incorporated herein by reference in its entirety.

FIELD OF THE DISCLOSURE

The present disclosure relates generally to rotary actuators, and more specifically to multi-speed hub drive wheels which incorporate such actuators.

BACKGROUND OF THE DISCLOSURE

Electric cars have been of interest for several decades, due to their energy efficiency, environmental friendliness, and performance benefits. Thus, electric powered vehicles convert about 59-62% of the energy taken from the power grid to power at the wheels, as compared to about 17-21% for their internal combustion engine counterparts. Electric vehicles also emit no pollutants, and provide quite, smooth operation and stronger acceleration, and require less maintenance, than vehicles powered by internal combustion engines. Moreover, since electricity is a domestic power source, the use of electric cars helps to reduce dependence on foreign energy resources.

More recently, the continuing development of battery technology (especially the development of rechargeable lithium ion batteries having relatively high energy densities) has begun to close the gap between cost and performance aspects of electrical cars and their internal combustion engine counterparts. Consequently, most of the major automobile manufacturers, as well as some recent start-ups, have introduced lines of electric powered vehicles. Examples include the VOLT® electric vehicle produced by Chevrolet, the LEAF® electric vehicle produced by Nissan Motors, the i-MiEV® electric vehicle produced by Mitsubishi, the Tesla ROADSTER® electric vehicle produced by Tesla Motors, the FORTWO® electric drive vehicle produced by Smart Automobile (a division of Daimler AG), and the e2o® produced by Mahindra Reva Electric Vehicles.

BRIEF DESCRIPTION OF THE DRAWINGS

FIG. 9 is a tabulation of considerations for multi-speed drive wheels (MDWs).

FIG. 10 is a tabulation of considerations for the human choice element of electric vehicles.

FIG. 11 is a tabulation of observations on the PROTEAN® electric drive.

FIG. 15 is a tabulation of the basic properties of an MDW.

FIG. 16 is a tabulation of ruggedness considerations for an MDW.

FIG. 17 is a tabulation of some of the benefits of switched reluctance motors (SRMs).

FIG. 18 is a tabulation of MDW development goals.

FIG. 19 is a tabulation of a marketing strategy for electric vehicles.

FIG. 22 is a tabulation of considerations for the short force path.

FIG. 23 is a tabulation of considerations for the clutch mechanism for two-speed MDWs.

FIG. 31 is an illustration of the structured design of a simplified reducer for an MDW.

SUMMARY OF THE DISCLOSURE

In one aspect, a multi-speed hub drive wheel is provided which comprises (a) a wheel equipped with a hub; (b) a star compound gear train having first and second stages; (c) a motor disposed in said hub which drives said wheel by way of said star compound gear train; and (d) a clutch which switches the hub drive wheel between a first mode of operation in which the motor engages the first stage of the star compound gear train, and a second mode of operation in which the motor engages the second stage of the star compound gear train.

DETAILED DESCRIPTION

Figure 33:
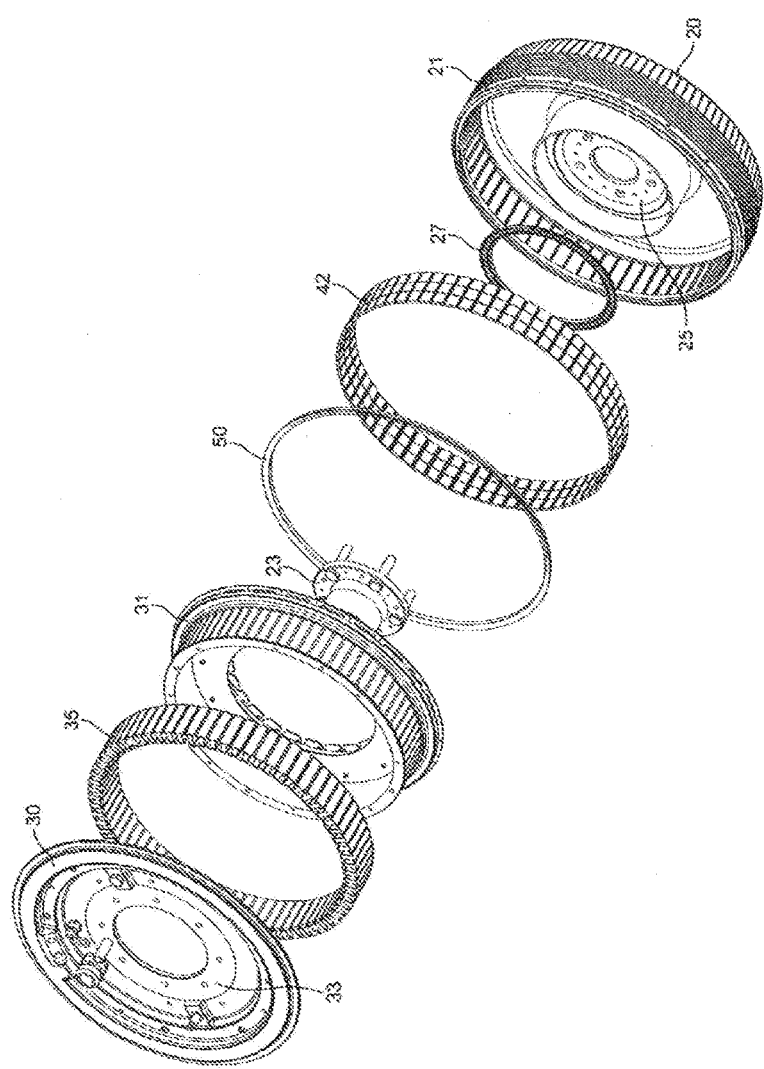
FIGS. 33-34 are illustrations of a prior art PROTEAN® drive.
Figure 34:
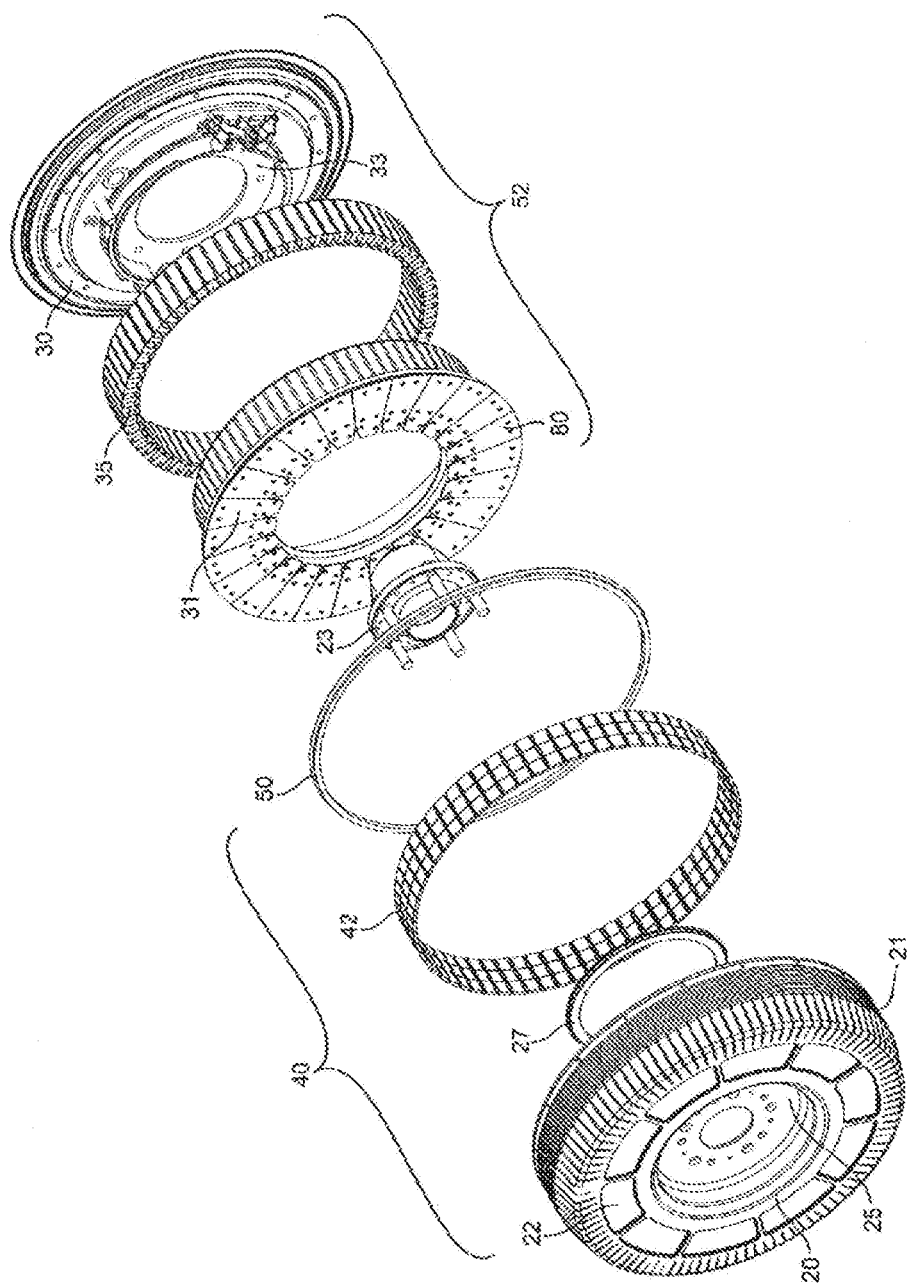

In addition to companies that manufacture electric vehicles, several companies have emerged that develop parts for such vehicles. For example, Protean Electric produces in-wheel, electric drive systems for hybrid, plug-in hybrid, and battery-powered electric vehicles. These systems are described, for example, in U.S. 2013/0049498 (Boughtwood), U.S. 2013/0069462 (Calvert) and U.S. 2013/0134839 (Boughtwood). An embodiment of the in-wheel, electric drive system from U.S. 2013/0134839 (Boughtwood) is reproduced herein as FIGS. 33-34.

With reference thereto, the system of Boughtwood comprises a stator 52 having a rear portion 30 that forms a first part of the housing of the assembly, and a heat sink and drive arrangement 31 that comprises multiple coils and the necessary electronics to drive the coils and the heat sink. The coil drive arrangement 31 is fixed to the rear portion 30 to form the stator 52 which may then be fixed to a vehicle and does not rotate during use. The coils themselves are formed on tooth laminations 35 which together with the drive arrangement 31 and rear portion 30 form the stator 52.

A rotor 40 comprises a front portion 20 and a cylindrical portion 21 forming a cover, which substantially surrounds the stator 52. The rotor includes a plurality of magnets 42 arranged around the inside of the cylindrical portion 21. The magnets are thus in close proximity to the coils on the assembly 31 so that magnetic fields generated by the coils in the assembly 31 generate a force on the magnets 42 arranged around the inside of the cylindrical portion 21 of the rotor 40 thereby causing the rotor 40 to rotate.

The rotor 40 is attached to the stator 52 by a bearing block 23. The bearing block 23 can be a standard bearing block as would be used in a vehicle to which this motor assembly is to be fitted. The bearing block comprises two parts, a first part fixed to the stator and a second part fixed to the rotor. The bearing block is fixed to a central portion 33 of the wall 30 of the stator 52 and also to a central portion 25 of the housing wall 20 of the rotor 40. The rotor 40 is thus rotationally fixed to the vehicle with which it is to be used via the bearing block 23 at the central portion 25 of the rotor 40.

However, while the foregoing drive system may have some desirable properties, it also suffers from a number of infirmities. In particular, the Protean drive is a simple, one-speed electric drive module which features a brushless D.C. rare earth motor. This motor has a large diameter air gap (approximately 15") which is difficult to protect against shock deformations, since it uses small diameter hub shaft bearings whose support is far removed from the air gap. Consequently, this drive system has low shock resistance and high deformations. Moreover, the air gap must be kept small (about 0.1") in order to produce higher torque. However, this small dimension is also tolerance and temperature sensitive. The Protean drive also requires a large number of permanent rare earth magnets, which are expensive and fragile (in particular, shock tends to create destructive magnet chips in the air gap). Also, these rare earth magnets do not have an assured supply, which is essential for mass production.

Moreover, the simplicity offered by the Protean drive is the result of a one-sided emphasis on electrical technology, which minimizes attributes that could come from a balance with good mechanical technologies. For example, the Protean drive does not utilize a gear train. Hence, the drive offers only one speed regime as the choice for the customer and one efficiency map, and thus offers a very limited set of choices for drivability (e.g., aggressive vs. quiet, or safety vs. maneuverability) and efficiency. This drive is thus suitable only for limited duty cycles, and likely provides efficiencies below 70%.

Moreover, while the Protean drive may be utilized for regenerative braking, it poses challenges with respect to thermal management and stopping power or distance, the latter of which would appear to require the inclusion of an additional disk brake. It is also not clear how an emergency brake may be enabled with this drive to allow parking on a slope.

In light of the foregoing, a need thus exists in the art for an advanced and economical multi-speed drive wheel (MDW) which addresses some or all of the needs posed by the oncoming revolution in all-electric cars. Such an MDW should preferably be durable, light weight, efficient, provide effective acceleration, come equipped with or interface with suitable operational software, provide emergency maneuvers, be equipped with suitable intelligence to respond to driver commands, and be amenable to rapid refreshability to prevent obsolescence.

A need also exists in the art for rotary actuators (and MDWs which incorporate or work in conjunction with the same) which utilize exceptionally high speed prime movers (for example, prime movers which operate at 15,000 RPM or higher) to drive a gear train to provide an output speed of perhaps 1,000 to 2000 RPM, as might be required for a high speed vehicle. Such an actuator should preferably provide simplicity of design, be inexpensive to manufacture, be highly durable, and have low mass, and hence, should be very power-dense.

A need also exists in the art for a first generation MDW design which is suitable for the fabrication of first generation prototypes that may be utilized to evaluate the potential of the MDW in future more-electric cars. Doing so would create an active input at each wheel for enhanced efficiency, drivability, and braking and enable the removal of the present passive mechanical drive train in favor of a completely open (modular) architecture.

There is also a need in the art for an MDW which expands human choices so as to respond to the customer's wants and needs. Such an MDW would provide original equipment manufacturers (OEMs) a larger market potential and a larger payout by using multiple suppliers in a responsive supply chain, as is currently the model in P.C. industry. Such an MDW would offer the OEM the potential of more income from the life cycle market (repairs and MDW updates). Such an MDW would also help to increase or maximize customer choice, which will be made more frequently to give the OEM more sales in the form of future repairs, upgrades, and reinvestment.

A further need in the art exists for rotary actuators which act to resist forces and deformations in all directions in order to act not only as torque generators, but also as joints in an active system (such as, for example, car hub-drive wheels, joints in robot manipulators, control surfaces for aircraft and ships, or construction machinery).

A need also exists in the art for rotary actuators which provide a shortest force path between one link attachment in the system and the next, so as to reduce the effects of deformation, temperature and tolerances, thereby reducing weight, volume, and cost.

A further need in the art exists for a compact shifting means of shifting from a low speed to high speed regime in a multi-speed hub wheel drive actuator. This shifting means should preferably have low (or minimum) complexity, volume, weight and cost, and provide a high level of endurance and driver flexibility.

A need also exists in the art for an expanded architecture for electro-mechanical hub drive wheels from single speed up to four mechanical speeds, in order to best match a wide variety of application requirements from lightweight vehicles (motorcycles, smart cars, modular reconfigurable cars, high efficiency and high drivability cars) to heavy off-road vehicle systems in construction, farming, and in the battlefield. In particular, in each such application, there is a need for a minimum set of wheel drive modules (say, 3 to 5) in order to continuously improve performance to cost ratios.

A need also exists in the art for a compact and rugged torque sensor which can accurately measure output torque for rotary actuators. Preferably, this torque sensor should not introduce unacceptable levels of compliance, and it should be able to resist external shocks, vibration, and magnetic fields.

A need also exists in the art for a means to expand vehicle choices to enhance or maximize the performance of an MDW under human command for enhanced efficiency, acceleration, peak power, and extended high speed operation. Half of these choices would be provided by structuring the power controller in four distinct configurations of its switching circuits and super capacitor to drive the prime mover of the MDW.

A need also exists in the art for a means to improve MDW efficiency. In particular, a need exists in the art for a means to raise the peak efficiency of MDWs from 88-89% up to 94-95%, to broaden the 90% sweet spot to 30% of the torque/speed map, and to broaden the 80% sweet spot to 70% of the torque/speed map.

A need also exists in the art for a means to monitor the performance capability over time of intelligent actuators as principal drivers of mechanical systems. These actuators represent more resources to perform their function under human command (duality for fault tolerance, layered control, force/motion control, multi-speed operation, etc.). Because of this complexity (sensor array, power supply, electronic controller, prime mover, bearings, gear train, tooth mesh), sources of degradation can come from many components in the actuator. Hence, such degradation now demands a formal analysis for predicting performance reduction, remaining useful life, time at which replacement is warranted, and other such parameters with increasing accuracy and, therefore, with a reduced incidence of false alarms.

A need also exists in the art for a formal structure to enhance decision-making in ever more complex systems with increasing performance capability in order to respond to human commands. Preferably, the structure should recognize the multiple layers of highly non-linear mechanical components (actuators, controllers, power supplies, tool/task interfaces, human/machine interfaces, etc.) that must operate in unison (i.e., reduce conflicts) in real time (often in millisecond timeframes) to permit open architecture systems to be assembled on demand to maximize human choice.

These and other needs may be met by the systems, devices and methodologies disclosed herein.

In a preferred embodiment, an MDW is disclosed herein which utilizes a rugged, switched reluctance motor (SRM) that contains no rare earth metal magnets, and which is driven by a (preferably two-speed) star compound gear train (SCGT). The SRM is preferably driven by a reconfigurable inverter which provides at least two operating regimes (efficiency and acceleration) to create at least four effective operating regimes (two electrical, and two mechanical) at each wheel. Hence, this design provides at least four basic regime choices at each wheel of the vehicle which incorporates the MDW. Preferably, a single large diameter bearing (which is preferably a cross-roller bearing) supports all principle gear train and wheel components in a shortest force path configuration, with the other bearings being smaller diameter (for low weight and low velocity/friction) fixed in rigid frames.

A compact shifting means is also disclosed which permits shifting from a low speed to high speed regime in a MDW of the foregoing type. This shifting means should have low complexity, volume, weight and cost, and a high level of endurance and driver flexibility. It has been found that this need may be accomplished in the front end star compound gear train (all gears are always in mesh) by using a two position clutch mechanism (with a neutral) to engage either the first or the last gear in this first stage.

I. Use of Low Complexity Gear Trains for a Full Architecture for MDWs

A. Overview

Advanced and economical multi-speed drive wheel (MDWs) are disclosed herein which are suitable for use in the on-coming revolution in more-electric cars and light vehicles. In a preferred embodiment, these MDWs are efficient, durable and light weight, and provide effective acceleration, emergency maneuvers, and intelligence to respond to driver commands. The MDWs are also preferably rapidly refreshable to prevent obsolescence, and are equipped with operational software to improve or optimize its performance.

The MDWs disclosed herein may be utilized as part of an overall scheme to open up the architecture of an electronic vehicle in terms of a minimum set of highly-certified components whose cost is managed by competitive pressure from multiple suppliers in a responsive supply chain. This approach is expected to cut vehicle costs by 2× in the same paradigm shift (responding to the customer) that has already occurred for the electronics industry (see APP G 2Human Choice in MDW Based Vehicles, UTexas Report, Jul. 10, 2012).

B. Background

U.S. technical development of vehicles is vigorously concentrating on the front end power generation segment of the more-electric vehicle. In particular, considerable attention has been paid to tuned engines, generators, batteries, super caps, and other such front end components. However, limited attention has been paid to the back end power utilization segment such as, for example, the powered drive wheels or the active suspension and camber.

As noted above, Protean (SOA) offers a sophisticated, single-speed electric drive wheel. However, this drive wheel remains shock sensitive, expensive, and inefficient in both urban and highway duty cycles. Accordingly, a multi-speed hub drive wheel is disclosed herein which represents a balance in electrical and mechanical technologies sufficient to create a science pathway for the cost-effective development of independently controlled drive wheels. Such drive wheels are expected to provide enhanced efficiency, as well as significant improvements in drivability and safety (e.g., emergency response and operation in poor weather).

C. U.S. Government Efficiency Requirement

The U.S. government has set goals for the auto industry which require the gas mileage of new vehicles to go from 27.3 mpg to 35.5 mpg by 2016, and to 54.5 mpg by 2025. These goals will require an improvement of 2× in vehicle fuel efficiency by 2025, which will only be possible with a tuned engine hybrid and electric multi-speed hub drive wheels (the MDW). Research suggests that the use of a single speed electric wheel drive to enhance traction can increase efficiency by 13% to 27%, depending on the duty cycle. See K. Xu, et. al., "Energy Management for Four-Wheel Independent Driving Vehicle", 2010 IEEE/RSJ International Conference on Intelligent Robots and Systems (October 2010, Taipei, Taiwan). Use of the MDW with system level traction control would get this efficiency up by 30% to 50%. Hence, in order to meet the 2× goal specified by the U.S. government, advanced MDWs of the type disclosed herein will be essential.

D. Proposed Technology

In order to achieve the foregoing objectives, it is desirable to utilize the simplest of electrical and mechanical technologies to provide an MDW for operating regimes that may manage drivability or efficiency under operator choice. In a preferred embodiment, this MDW is equipped with an extremely rugged final gear train with a large diameter output bearing (which also acts as the wheel bearing) as part of the gear train. Such an arrangement may be expected to provide 6× to 10× more shock resistant than the Protean drive described above.

The MDW also preferably provides a level of energy loss reduction improvement of 1.9× for urban duty cycles, due to the two mechanical speeds, over the single-speed Protean drive. Another loss reduction of 1.5× is expected from enhanced materials and reconfigurable power/electronic controllers (two additional distinct operating regimes). The prime mover is preferably disposed in a separate design module (either brushless DC or SRM) for maximum protection from shock or brake temperature rise. Two basic geometric manufacturing patterns may be provided for the 16/20/24 HP and 32/40 HP levels to minimize cost and enhance mass production. The total of four operating regimes for the MDW enables either maximum drivability (as requested by the driver) or maximum efficiency (staying in the prime mover's highest level efficiency sweet spot).

E. Enhanced Vehicle Availability

An open architecture for electric vehicles is a key to achieving the foregoing objectives. Open architecture electric vehicles composed throughout of standardized components—such as, for example, a tuned engine or generator, modular battery cells, supercaps, controllers, electric drive wheels, an active suspension steering and camber actuators—enables the dramatic reduction of single-point failures to increase vehicle availability, avoid sudden failures (and false alarms), predict when components should be changed out before failure (through third-party apps), and permit reconfiguration to maintain operation under a useful level of remaining performance. This would enhance the operator's personal safety, reduce the threat of accidents, and reduce the time demand when the vehicle would otherwise be inoperable.

F. Elimination of Single-Point Failures in Vehicles

For a fully developed vehicle with hybrid power generation and power utilization, the MDW disclosed herein makes it possible to virtually eliminate single-point failures. Should the ICE (Internal Combustion Engine) or the generator fail for any reason, the modular battery and drive motor can still operate the vehicle for a reasonable period, unless the drive motor itself fails. Distributing the drive to each of the four wheels of a typical vehicle by using a 4-speed MDW ensures that, should any one wheel fail, 75% of drive capability remains. Any level of failure in the MDWs may automatically be compensated for by control reconfiguration, based on available known traction force margins at all wheels. This is similar to the approach currently utilized in an Automatic Braking System (ABS).

G. Enhanced Vehicle Efficiency

Each power supply/prime mover combination represents performance maps (responsiveness, torque/speed, efficiency, temperature, etc.) which are highly nonlinear, requiring a structured decision making process. Performance maps of this type are described, for example, in "Actuator Intelligence Based on Performance Maps and Envelopes", Internal University of Texas White Paper, D. Tesar, et. al. (Dec. 15, 2005). Efficiency maps usually reach a peak of 88 to 89%, the 80% sweet spot represents about 30% of the operating region, and at 70% (30% losses), about 70% of the map is available, leaving 30% (which represents truly bad efficiency). A preferred embodiment of the MDW disclosed herein will use four operating regimes (2 electrical, 2 mechanical) to always stay close to the center of the sweet spot. The power controller/prime mover design and use of materials disclosed herein has the ability to raise the peak to 94-95% and broaden the sweet spot for 80% efficiency to cover 70% of the map, substantially expanding operational choices (responsiveness for drivability and smoothness for efficiency) for a wide range of duty cycles. It has been found that a 2.0 to 2.2× reduction in losses may be achieved for both urban and highway duty cycles. Moreover, research conducted in Europe shows that, with active drive wheels, suspension, camber, and steering, the force traction patch expands by 6 to 10×, further dramatically expanding operational choices, especially for poor weather conditions and off-road operation. Overall, it is believed that the average efficiency of the MDW may be improved over the state-of-the-art Protean drive described above by reducing losses by 3×, and through the use of high level vehicle wheel/road surface traction control to improve overall power utilization effectiveness by 4×, independent wheel traction by 6×, while at the same time, initiating the cost reduction of the open architecture vehicle by 2×.

H. Low Complexity Gear Trains

Low complexity gear trains are a key factor, and perhaps the central component, of the MDWs disclosed herein. All electric prime movers can generate high power only at higher speeds (up to 15,000 RPM) because of their low torque production. Hence, a gear train is essential to reduce this speed from 15,000 to 500 RPM using a 30 to 1 gear train reduction while boosting torque 30 times. The simplest of these reducers are either star compound or epicyclic reducers, which are built using all standard components (small diameter/low friction bearings, helical gear teeth, rigid frame structures, etc.) in completely symmetric arrangements of multiple star/planet gears around a central shaft to keep all forces balanced without high loads which cause twisting deformations requiring heavy case structures. These reducers are expected to be the lowest cost alternative in each case, and may be standardized in a minimum set for a given application domain, just as has been done in the past for computer chips to reduce cost while increasing performance.

Typically, the simplest arrangement to create the actuator is to put the prime mover in a serial arrangement where the motor "plugs in" on the side of the gear train to use standard prime mover designs. These gears are preferably supported by one rugged backbone to make a very compact, rugged, easily assembled configuration. The principal bearing is held between the backbone frame and the output plate (which also contains the final stage gear), which forms a shortest force path to enhance stiffness. This has a number of beneficial results including, for example, reductions in weight, in deformation, and in the effects of tolerances and temperature.

I. Criticality of Multiple Speed Choices

Prime movers (including their controllers) typically have efficiency sweet spots (best local efficiency) in their torque-speed performance map. The highest efficiency might be 92%, while the lowest is typically less than 50%. Hence, to enable reasonable torque production at higher efficiency, the operating speed range must keep the motor in its sweet spot.

Doing so requires configuration changes in the electronic controller and in the gear train. In some of the systems and methodologies described herein, synchro clutches are utilized in a very unique or simple gear arrangement to provide up to four distinct speed changes. Simply by using a single speed change relative to a single speed drive, energy loss reductions may be increased by 2.2× for urban duty cycles, and 1.9× for highway duty cycles.

J. Preferred Clutch/Gear Train Configuration

A preferred embodiment of the actuators described herein utilizes a combination of a star compound and epicyclic gear train in which the star compound cage is fixed while the epicyclic ring gear rotates, or in which the ring gear is fixed while the star compound cage rotates about the central shaft. This approach keeps the synchro clutch cones outside of the gear volume, making that volume as small as possible to reduce weight. Since the cone clutches are of a larger diameter d, they are able to generate high friction torques (i.e., this torque increases by the square of d). Consequently, switching time goes down as this torque increases. Also, this dual star/epicyclic gear train enables the gear shift simply by stopping the epicyclic cage (to make a star compound) or by stopping the star ring gear (to make an epicyclic). The speeds of the cage or ring (which is very light) is preferably never higher than ⅕ the speed of the prime mover. Consequently, the effective inertia relative to the prime mover is preferably about ½5, which ensures far better switching times. Further, stopping a gear is far more forgiving than matching gear speeds as required in all other synchro clutch designs. Hence, the resulting assembly should be essentially noiseless, while enabling switching speed times 10× less and allowing remote reliable simultaneous switching operation among four or more MDWs.

For automobiles, a single clutch may be utilized with reduction ratios of 38 to 1 for low speed operation, and reduction ratios of 9 to 1 for high speed operation. For a 22" tire, the maximum motor speed would typically be about 12,750 RPM at 90 mph. This remarkably simple synchro star compound/epicyclic is all that is required to make a cost effective wheel drive of exceptional low weight, ruggedness, and compactness (it looks like a pancake unit). Moreover, a wheel drive of this type is easily standardized for high production in a minimum set of various horsepower levels. Using smaller reduction ratios of 15 and 4.3 to 1, a 3 to 1 single plane star compound may be used in series at the backend to give overall ratios of 45 and 13 to 1 for a balanced design of several unique attributes (ruggedness, lower inertia, higher torque capacity, etc.).

A heavy on/off-road pick-up truck with 30 inch tires may require the ratios of 90 to 1, 55 to 1, 26 to 1 and 16 to 1, which would provide high drawbar pull at low speeds (below 12 mph) and a satisfactory top speed of 80 mph and a prime mover rotation speed of 14,400 RPM. For heavy earth movers, four speed reduction ratios of 570 to 1, 140 to 1, 65 to 1 and 40 to 1 may be satisfactory to provide maximum drawbar pull on a 48" wheel at 3 mph and a maximum transport speed of 30 mph.

II. Use of Low Complexity Gear Trains for a Full Architecture of Multi-Speed Hub Drive Wheels A. Objective One of the concepts disclosed herein is the use of low complexity gear trains for a full architecture of MDWs, the objective being to revolutionize the performance (efficiency, drivability, durability, maintainability, etc.) of more-electric vehicles while reducing their life cycle cost and providing improved safety in poor weather and emergency maneuvers. To open up the architecture of these vehicles and make them responsive to human command requires the aggressive development of the intelligent corner (active camber, steering, suspension, and drive wheel) of which the MDW is the most near-term cornerstone for this development. The basic technology required for the embedded gear train of the MDW in order to provide a complete set of technical choices from 1 to 4 mechanical speeds, while making low-cost mass production feasible, is described herein.

B. Background

Figure 1:
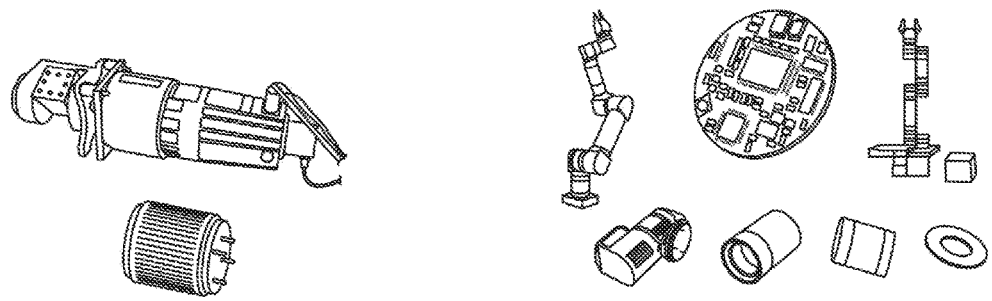
FIG. 1 is an illustration of 1995 state of the art rotary actuators.
Figure 2:
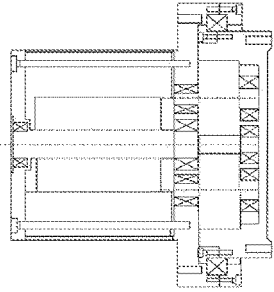

The present inventor has been engaged in a three-decades-old effort to develop four classes of actuators (low complexity, high torque density, high acceleration, and multi-speed drive wheels) which are targeted to both military and commercial applications for robotics, vehicles, handling systems, manufacturing cells, surgery, aircraft, and various other applications. Approximately 8 orders of technical base growth have occurred over the past two decades, with an emphasis on simplicity, ruggedness, durability, and high survivability. FIG. 1 shows the state of the art of the work at UT in 1995, where prototype development demonstrated a 70× improvement over the SOA and enabled the assembly of a modular 6 actuator robot manipulator in about five minutes.

C. Principle Goals for the MDW

As previously stated, it is an objective for some of the MDWs described herein are to maximize efficiency, reduce costs, and to increase customer choices for drivability, maintenance, tech updates, and safety. In order to meet these objectives, it is preferred that the MDW provide distinct speed ranges (both electronically and mechanically), as is currently the case for 6 to 7 speed mechanical transmissions, to enhance present vehicle acceleration and engine efficiency. Hence, it is a goal for some of the systems, devices and methodologies described herein to dramatically expand these choices in terms of the MDW (in the wheel) in order to open up the architectural choices throughout the vehicle (e.g., by removing the constraining drive train in favor of a highly tuned light diesel/generator combined with and efficient battery package and supporting super caps). Doing so will dramatically reduce single point failures (sudden vehicle total shutdown) which becomes a significant marketing concept. Unfortunately, most of the electric drive wheels developed to date either do not use a gear train (resulting in an unbalanced and un-winning tech base), or they use a simplified one-speed simple compound or epicyclic gear train, both of which do not perform well in this application.

D. Proposed MDW Gear Train Development

The MDW gear train advances described herein build, in part, on the inventor's extensive work on low complexity actuators to create MDWs with 1 up to 16 operating speed domains. Part of this development is associated with 2 to 4 speed domains supplied by a reconfigurable power controller. Gear trains are described herein which supply 1 to 4 mechanical speed choices. The one mechanical speed choice utilizes gear ratios from 5 to 1 up to 500 to 1 which are provided by one-plane star compounds (SC) up to two 2-plane SCs in series to maximize designer choices on prime mover speeds, overall actuator weight, torque density, responsiveness, and durability.

In order to achieve multiple speeds, a clutch is typically required within the gear train. This clutch may be described either as a ball clutch (for light duty applications) or as a synchro mesh clutch (for medium to heavy duty applications). A clutch/gear train arrangement that may be the best overall concept is described herein as a simplified two-speed reducer using large diameter friction cones to engage blocking rings and large diameter synchro gears while choosing between a star compound (cage fixed) or simplified epicyclic (ring gear fixed) gear train configuration. These synchros only have to "stop" their respective cone-gear elements. This gear change requirement is very forgiving, and may enable switch times below 200 msec. For very heavy vehicle applications (farm machinery, construction systems, armored battlefield vehicles, and the like) with emphasis on off-road operation, four mechanical speeds may be achieved by putting two of these clutched gear modules at both the frontend and backend of the MDW to give four reduction ratios from 9 to 96 to 1.

The foregoing leads to a full MDW architecture with 2 to 4 electrical speed domains combined with up to 4 mechanical speeds so as to enable the broadest possible range of applications for this MDW tech base. This includes ATVs, battlefield robots, automobiles, fleet vehicles, heavy transport vehicles, construction and farm machinery, and even 70-ton, 14-wheeled armored vehicles. This enables a revolution in more-electric vehicles, thus warranting a strong investment for rapid technical development.

E. Electronic Controller and Position Sensor

The position sensor may be placed inside the wire coil to measure the relative position between the input drive shaft and the output attachment plate. The electronic controller may be designed as a cylindrical ring mounted outside the motor shell next to the gear train outer shell. This protected placement makes it easy to gain access and to remove it somewhat from heat sources in the motor.

VII. Merits of Star Compound Gear Trains

A. Comparison with Commercial Gear Trains

The University of Texas began its development in low complexity actuators in the mid-1990s, building a prototype self-contained actuator using a harmonic drive gear train and then, assisted by our spin-off company (ARM Automation, Inc.), showed how to assemble a light duty 6 DOF manipulator in 5 minutes. In a recent comparative analysis, the star compound gear train was identified as an attractive gear train (especially relative to the epicyclic gear train) as a core component in low-end actuators. Using three basic comparative measures (see TABLR 3 below), the benefits of the UT design is stunning. In all cases, the best commercial product numbers were used in the comparison. Stiffness of >4× was achieved, the equivalent inertia was >10× (except in one case), and the torque density was >15×. All three of these measures are very important to most applications.

TABLE 3

Parametric Comparison With Commercial Low End Gear Trafus
(≈5" × 5" – D/L)

| Actuator Supplier | Torque Density | Equivalent Inertia | Output Stiffness |
|---|---|---|---|
| A | 20× | 1× | 6× |
| B | 8× | 10× | 30× |
| C | 25× | 10× | 3× |
| D | 18× | 10× | 3× |
| E | 14× | 20× | NA |
| Average | 15× | 10× | 4× |

UTexas Equivalent: Torque Density > 2040 in-lb/lb
Reference Parameters Output Stiffness ≈ 670 in-lb/min. Equivalent Inertia ≈ $0.84 \times 10^{-4}$ lb-in-sec$^2$ High Torque density means that system weight goes down. Low equivalent inertia means that the system rapidly accelerates in response to commands, and high stiffness means that the actuator can passively reject force disturbances (i.e., maintain its position relative to load shocks).

B. Other Attributes of Star Compound Gear Trains

All bearings in the star compound are in fixed gear cages that are fixed to a rugged backbone. Also, all these bearings can be of small diameters, thus reducing their element rolling velocities and, therefore, their losses. Since the heavily loaded bearings are rotating at the lowest angular velocities, losses are further reduced. Moreover, since the input pinion of these star compound gear trains is small in diameter, the effective inertia is much lower than in most other gear trains.

A dramatic expansion of design choices occurs when a front end and a back end star compound gear train are put in series. In doing so, the best of both concepts may be realized, that is, a low force, high velocity front end and a high force, low velocity back end. Usually, the front end is relatively small, while the back end uses wider gear faces to maintain load capacity. In fact, an effort has been made to standardize the back end in the two stage designs. Standardization means that the back end reduction ratio varies from 10 to 1 up to 18 to 1. This variation may be accomplished by very small changes in the gear radii, enabling the redesign to be quickly achieved. Also, there is an attempt to use circular arc gear teeth in the last mesh.

C. Reduced Two-Stage Equivalent Inertia

One major benefit of two-stage gear trains is to create low velocities in the heavy inertia gears in the back end of the device and use low inertia gears in the higher velocity front end. Given a front end of 10 to 1 reduces the inertia content of the back end by 100×. Going to 20 to 1 in the front end raises this to 400× so that one only has to worry about the inertia content of the front end. The back end is used for load capacity and durability. It now appears that the front end reduction ratio should vary between 5 up to 15 to 1 and the back end from 10 up to 18 to 1 to give a range of reduction ratios of 50 up to 270 to 1. This ratio can go up to 300 to 1.

VIII. Design Concerns for Low Complexity Gear Trains

A. Concerns for Backlash

Many attributes of the low complexity gear train based on the one and two-stage star compound were given in Sec. V above. The reality for most (if not all) external gear meshes is that they require a significant backside clearance to work (up to 0.005"). So long as the gears drive in only one direction (as in a high speed uni-directional power transmission), this is not an issue. Unfortunately, actuators must frequently go through load and velocity reversals, thus resulting in backlash. This backlash not only reduces accuracy (say, between 3 and 8 arc. min. for smaller gears), but also gives rise to noise generation in the crossover, unless special dynamic programming is used to reduce contact forces during the direction reversal. The gear trains developed to date that can offer little or no backlash are those with internal/external gear diameter ratios $d_i/d_e \approx 1.0$. These are the Harmonic Drive (low load capacity, low shock resistance), the cycloidal drive (large lost motion, average shock resistance) and the parallel eccentric developed by UT (average to good lost motion and high shock resistance).

B. Helical Gear Teeth

Much of the backlash dilemma may be avoided through the use of a helical tooth design with a greater than 1 axial pitch, ensuring that 2 or more teeth are always in contact. Generally, given good design and manufacture, helical teeth will carry approximately 2× the load. Unfortunately, these results are only possible if the gear axes are very well aligned (say, better than 1.0 arc min. or bearing shaft locations near 0.0002"). Even then, the load concentration on one side of the gear face might be 200%, reducing load capacity and stiffness by 2×. To prevent this, the teeth may be provided reliefs to compensate for tooth deformations at their design load. Actuators must operate over a very wide range of loads. Hence, the relief must be designed for 50% of their maximum load. Also, helical teeth pick up their load at one end of the tooth and drop it off at the other end. The effect of sudden pick-up/drop-off is reduced by using end-reliefs which cuts their load capacity by ≈20%, depending on their overall length (face width). One of the penalties of helical gear teeth is that above a 10° angular helix, the thrust forces may require tapered roller bearings, an increase in cost, some more careful assembly, and some space demands.

C. Potential for Circular Arc Gear Teeth

In the last mesh of the star compound gear train, it is possible to have the gear diameter ratio $d_f/d_e \approx 4.0$. It now appears that this ratio would permit two or more circular arc teeth to be in contact. The standard heavy duty final stage shown in may be able to benefit from this tooth design. The first mesh will preferably be helical for critical designs (to reduce noise/backlash). The last mesh will be a competitive development between the possible circular arc tooth and the helical tooth.

D. Tooth Deformation

All gear teeth deform under load. In general, for a 1" face width, a tooth of 4 mm module (a $D_p$ of 6.25) can carry 2,000 lb. and will deflect about 0.0011" at that load. Hence, this tooth deflection is 5 to 12× the normal tooth spacing error (≈0.00008 to 0.0002"). This means that the tooth stiffness at radius r gives a rotational output stiffness of approximately $K=600\ r^2$ in-lb/min for each tooth contact.

E. Gear Pair Deformation

Another issue exists when using a heavily loaded pinion. In lightly loaded actuators, a pinion of a high aspect ratio $L/D \approx 2.0$ may be used to provide high reduction ratios. Given high motor torques, this pinion can twist and significantly reduce contact ratios, resulting in high contact stresses. Given high torques on the pinion, it is desirable that the aspect ratio be <1.0.

F. Gear Mesh Balancing

Star compound gear trains benefit from equal tooth contact forces between the symmetrically placed gears. Accurate bearing placement and accurate gear centerlines can make this more likely. In any case, it is desirable that the pinion be allowed to float by using radially compliant bearings to support each side of the pinion, equalizing contact force imbalances.

IX. Multi-Speed Electric Drive Wheels

A. Background

A sudden interest in more-electric automobiles has occurred due to increasing fuel costs and a desire to create a more modern (intelligent) vehicle capable of more driver choices (efficiency, safety, acceleration, smoothness, poor weather operation, etc.). Indeed, the present inventor has proposed an All-Electric Modular Automobile (AEMA) which may be assembled on demand in terms of a responsive supply chain, as is currently the case for personal computers. This AEMA concept grows out of an open architecture vision for mechanical systems. For the AEMA, the new choices (beyond the present hybrid technology) would be an intelligent corner for the vehicle, composed of (a) a multi-speed drive wheel (MDW), (b) active suspensions (plus steering or camber), and (c) intelligent software to manage all corner functions.

The present technology for electric hybrid automobiles essentially puts an electric motor (and perhaps a poorly engineered epicyclic gear train) in the present mechanical drive train with no additional choices, leaving the torque tube, differential, axles and suspension in its present form. Intelligence permits the management of human operator choices. However, invariant mechanical systems contain no new choices.

Current automatic braking systems (ABS) provide a significant improvement in braking safety, though unfortunately with little driver input. This benefit may now be expanded to other driving phenomena (traction, acceleration, efficiency, controlled slipping, and the like) under direct commands of the driver (be smooth, be quiet, be efficient, it's poor weather, the roads are slippery, etc.). This puts the driver in control, and also permits improved or optimal performance and a natural learning by the driver. These features may then become marketing tools for the vehicle and technology.

It follows from the foregoing that the drive wheel should contain choices. These choices may be embedded in plug-and-play modules which are chosen by the car owner (when the purchase of the car is made or down-stream to get more horsepower, to up-date the wheel module, or to replace a worn out module). Given serious technical consideration, it would soon become obvious that drive efficiency is a critical necessity in future electric automobiles. Given a direct drive (no gear trains) electric hub motor means that it can be efficient only in a small "sweet spot" of the torque/speed map. To stay in the sweet spot demands choices in speed ranges. This requires a set of speeds managed by the driver, just as is currently done for internal combustion engines for the same reasons (acceleration and efficiency).

An embodiment of an MDW is disclosed herein which provides four distinct speeds (two mechanical and two electrical, to minimize cost and complexity). This MDW may be expanded upon to provide, for example, four electrical and four mechanical speeds, thus enabling a total of sixteen choices.

B. Proposed Technology

At present, billions of dollars are being expended in the U.S. on hybrid/efficient electric cars without a balance of advances in both the electrical and mechanical technologies. While an extraordinary effort has been placed upon batteries and electric motors, a comparatively small effort has been devoted to the mechanical side of this technology base. For example, if a gear train is proposed, it is the epicyclic gear train, which is the poorest possible choice for many applications. By contrast, a simple 4-to-1 gear train is disclosed herein which is equipped with a front end and a star compound 15-to-1 back end to give a speed change from 250 RPM up to 1000 RPM for the wheel (about 70 mph). The electric motor may be driven under two controller configurations to result in two additional speed domains to make a total of 4 domains.

An important feature of some of the systems, devices and methodologies disclosed herein is the in-depth integration of all technologies in the hub drive wheel, with special interest paid to durability, extreme design care to reduce weight, a paranoic effort to reduce the number of parts, and the incorporation of quick-change interfaces to enhance the plug-and-play nature of these systems. The star compound gear train is preferred in the systems, devices and methodologies disclosed herein, due to its extraordinary attributes. In particular, the star compound gear train provides the advantages of low velocity small diameter bearings in a rugged stationary backbone/cage, very low inertia to enhance acceleration, low velocity gear meshes, compactness, and other desirable attributes.

IX. Use of Star Compound Gear Train for Single Speed Hub Drive Wheel

A. Objective

In a preferred embodiment of the MDW disclosed herein, a star compound gear train is utilized for a single speed hub drive wheel. The objective here is to use exceptionally high speed (say 15,000 RPM) prime movers to drive a gear train to provide an output speed of perhaps 1,000 to 2000 RPM, as might be required for a high speed vehicle. A further objective is simplicity, low cost, high durability, and low weight. Consequently, the MDW is preferably very power-dense. Thus, for example, in a typical application, the MDW may provide 25 to 30 HP output in a 50 lb. module, and may do so at moderate losses. This class of operation may experience infrequent periods of complex duty (such as, for example, acceleration or high torque), but it primarily operates with a slowly changing output velocity. Because of its compactness, the module may require active cooling, just as the automotive radiator cools the internal combustion engine.

B. Actuator Description

The stator of the actuator prime mover is held in the outer shell. The rotor and rotor shaft rotate on three stationary bearings held in the back plate, backbone, and in the assembly boss (or collar) which is attached to the output attachment plate with a bolt circle. The first plane of the compound gear train is made up of input pinion gear (part of the drive shaft) and three output gears which are symmetrically located around the pinion at 120° intervals. These output gears are supported by stationary bearings mounted in the backbone and cage plate of the actuator.

Each output gear axis in the actuator also contains a second small star gear as the driver of the output internal gear of the compound gear train. These three small star gears mesh with the large diameter internal gear which is a rigid part of the output attachment plate. The principal cross-roller bearing ensures a light weight, but exceptionally stiff, bearing for not only the gear train, but also the output joint (axle) of the actuator module (that is, this bearing has two duties—to rigidize the structure and to simplify it). Finally, the small star gears are supported by bearings in the cage plate which is centered on the actuator centerline. This ring disk is rigidly attached to the actuator backbone with three rigid bridge structures (not shown) in order to prevent its rotation under the internal forces on the gears in the actuator.

B. Actuator Attributes

The bearings in the actuator are held in stationary housings. The system is relatively easy to assemble, and few of its dimensions are critical. The input pinion gear is the key to the success of the actuator, and it is therefore supported by two adjacent bearings which are purposely compliant in the radial direction so as to permit the pinion to float. The output is very rugged because three pinions drive the large diameter output internal gear, and because the cross-roller bearing provides the highest possible stiffness (in all directions) and shock resistance.

The possibility exists to run the rotor at speeds of 15,000 RPM or higher in order to dramatically increase its power density. This capability should be particularly attractive for high constant speed applications, such as embedded drive wheels for electric automobiles. The actuator may also be used for more complex duty cycles such as, for example, in off-road vehicles or in mobile platforms in factories. Actuators of this type may also be utilized as the driver for extremely lightweight fault tolerant aircraft actuators and in the front end of high torque two stage gear trains.

C. Representative Gear Design Sets

It is useful to see how distinct values for the gear sizes affect the proportions in the star compound gear train, its reduction ratio R, and the ratio r of the radii of the last star gear R7 to the internal output gear R8. The first design set provides a very modest choice of gear values, a reduction ratio of 12 to 1 and a ratio r of 0.25. Without wishing to be bound by theory, it is believed that r values smaller than 0.25 would make it difficult to use circular arc gear teeth in the last gear mesh, which could easily double the load capacity of the gear train. The second design set provides a reduction ratio of 15 to 1 with an r value of 0.20. The third design set gives R=19 to 1 with r=0.21. Finally, very aggressive gear values in the fourth design set 4 gives a very high R of 39.1 to 1 and a very low value of r=0.136. The last three design sets would typically use involute gear teeth in the last mesh. Also, in some cases, it may be necessary to use helical gears in these meshes to reduce noise and to increase load capacity.

X. Development of the Multi-Speed Hub Drive Wheel

A. Human Choice

One of the main concerns in commercial products that are intended to meet human needs is the desire to provide a continuous expansion of human choice (that is, to respond to the customer). In the case of some of the systems and devices disclosed herein, these expanded choices for the user may be separated into two basic operating regimes: drivability (safety) and efficiency (durability).

Drivability provides acceleration, speed, and maneuverability choices to an active (aggressive) driver. It includes overtones associated with safety (as now provided by ABS in braking), maneuverability to respond to emergencies, and special control scenarios for poor weather (for example, ice, snow, wind and rain), all of which demand local wheel intelligence to respond to human command. Efficiency may also be of high importance in urban fleet vehicles (controlled acceleration and stopping in a repeating pattern) and high speed, but efficient, operation at highway speeds to maintain velocity (with nominal acceleration) against rolling friction, 3% grades, headwinds and the like so as to minimize fuel consumption.

All of this set of choices now is embodied in the concept of "power utilization". Of course, this has to be combined with a very efficient power plant (tuned high speed/light weight internal combustion engine, generator, battery or flywheel energy storage, and ultracap for rapid bursts of power) to provide the necessary "power generation".

Most of the work in the art to date worldwide has concentrated on the generation part of the future more-electric (hybrid) automobile. However, in the systems and methodologies disclosed herein, the focus instead is frequently on the power utilization part which maximizes human choice where the customer's expanded needs are met at the time of purchase as well as during the automobile's operation. It has been proven that in the field of personal computers, human choice is the dominant marketing tool to stay ahead of the competition. Hence, it is anticipated that power utilization will be the major marketing tool for future automobiles (see, e.g., FIG. 10).

The second marketing tool will be cost. To reduce cost, the P.C. industry has proven that ever-improving performance-to-cost ratios are essential to stay in the market. To do so means standardization, both in power generation and power utilization. In utilization, the delivery of power to the wheels under human command is represented by the MDW as a standard (on 2 or 4 wheels), plug-and-play (from 16, 20, 24, 32, up to 40 HP) to provide 5 to 10 second acceleration times to 60 mph. Customers can choose what they wish to pay for while in the show room (i.e., the MDW becomes the customer's standard for investment, since they know precisely what is being provided for their investment) because it becomes a widely accepted measure by the larger community. In order to do this, the OEM must provide a minimum set of MDWs (say, the 5 listed above) of increasing performance/cost ratios (i.e., standard measures clear to the customer). Then, those who can stay ahead of the competition can garner the lion's share of the market.

The OEM may then control the supply chain to populate more cost-effective vehicles at the time of purchase and during the life cycle of the car. Currently, most OEMs lose control (make little revenue on repairs and upgrades). By contrast, such openness here not only allows them to control the purchase cash flow (drivability, efficiency, customer demand cycles, and plan for future upgrades) but also allows them to control the repair/upgrades cash flow (priorities/sales, tech modernization, and a responsive supply chain). Hence, the OEM has everything to gain by being the first to have open architecture for the power utilization of future, more-electric automobiles.

Finally, the customer wants to choose durability versus cost. They may choose from a variation in low to high end MDWs, modest to very responsive operational software, 5,000 up to 20,000 hour durability, low to high power levels, modest to critical design for reduced weight, or other parameters, all within a minimum set of MDWs. This may be done with the supply chain and the OEM (who is now an integrator/marketer) still making sufficient sales to warrant their roles while giving customers increasingly what they want—human choice.

B. Present MDW Development

Figure 14:
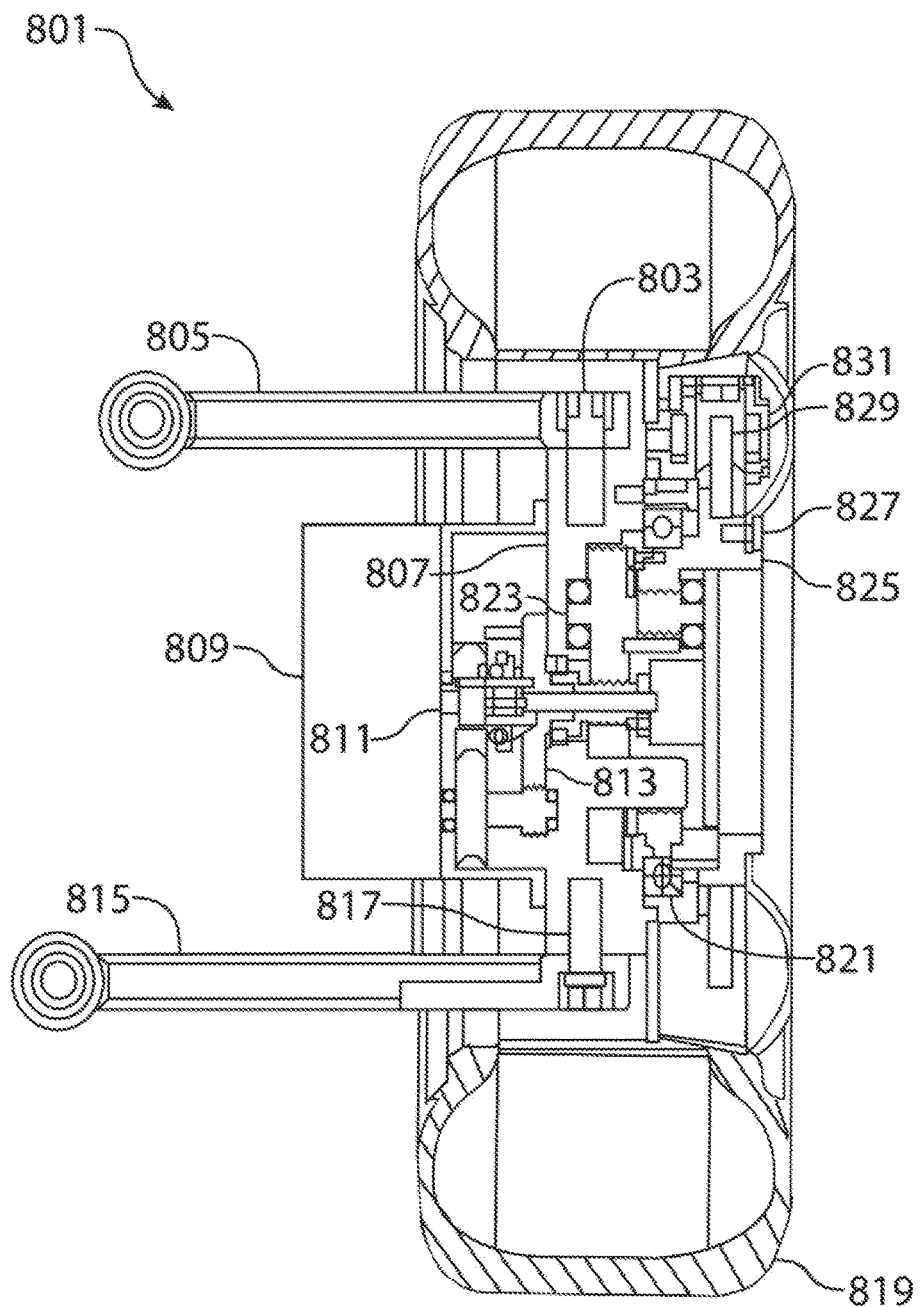
FIG. 14 is an illustration, partially in section, of an MDW wheel suspension geometry.

FIG. 14 depicts a particular, non-limiting embodiment of a Multi-speed hub Drive Wheel (MDW) in accordance with the teachings herein. This MDW uses a rugged Switched Reluctance Motor (SRM) with no rare earth magnets to drive a two-speed Star Compound Gear Train (SCGT). The SRM will be driven by a reconfigurable inverter for two operating regimes (efficiency, acceleration) to create four effective operating regimes (two electrical and two mechanical), or a total of four basic choices at each wheel. This module provides for exceptional ruggedness (FIG. 14). One principal large diameter bearing (probably a cross-roller bearing) supports all principal gear train and wheel components in the shortest force path configuration. All other bearings are small diameter (for low weight and low velocity/friction) fixed in rigid frames.

The high speed SRM is provided in a self-contained shell as a plug-on module of varying lengths to give increments in torque and power capacity while allowing rapid replacement without disturbing the rest of the MDW. Because it is in its own shell and is far removed from any wheel and suspension forces, its air gap is very protected. Note in FIG. 14 that the protective suspension arms also reduce the threat of impact on the SRM from foreign objects thrown up from the road. Also, because it does not use rare earth magnets, it is temperature tolerant to enable forced air cooling to reduce complexity and cost.

A three position clutch can lock the motor to the pinion of the first stage of the SCGT (to provide a reduction of 49-to-1) for low speed operation or to the pinion of the second stage of the SCGT (to provide a reduction of 14-to-1) for high speed operation. In between, the clutch can be held in neutral so that it does not drive either pinion. These two mechanical speeds (with the two inverter configurations) provide four basic choices for the customer to meet his needs for drivability and efficiency.

The design of the MDW in FIG. 14 would, without detailed refinement, be expected to weigh about 95 lb. and produce 390 ft-lb. torque with the use of forced air cooling. Use of a 5,000-hour duty cycle assessment, perhaps high-end aluminum shell, higher quality gear materials (at 125K psi stress for bending and 325K psi for contact stress), careful helix angle selection, and the like may well reduce this weight by 40 to 50% or approximately 50 lb. overall for the 16 HP version. This is considered to be a reachable (and remarkable) goal.

The potential for low cost mass production is the principal reason for the combination of the simplest possible electrical (the SRM) and mechanical (the SCGT) technologies—a combination purposefully set aside by most electric wheel drive developers in the drive towards apparent (but counter-productive) simplicity. Here, all components (SRM, bearings, helical gear teeth, etc.) are standard, with the intent to provide 5000-hour durability. Because of this simplicity, mass production at increasingly lower cost becomes feasible (contrary to the probable cost limits faced by the Protean drive described above, with its emphasis on apparent simplicity but not cost). It appears in the MDW design in FIG. 14 that several torque level SCGTs could be housed in a common shell (say, the 16, 20, 24 HP in one shell and the 32 and 40 HP in another shell). These two shells with two basic diameters could match two SRM diameters with three lengths for 16, 20, 24, and two lengths for 32, 40 to further reduce costs (by minimizing shell costs and using only two distinct laminate shapes).

In all cases, the suspension arms are connected to bosses very close to the strong SCGT backbone and the wheel and brake are attached to the output plate, all of which is connected by the shortest force path through the principal bearing. The cross roller bearing cost would be expected to come down due to the pressure of mass production. Also, the motor materials (laminates, wiring, and insulation) must be given critical attention to continue to improve performance while reducing cost. Doing so would then enable performance management by human command through continuously upgraded decision making software for enhanced drivability and efficiency.

C. Ruggedness

In the preferred embodiment of the MDW disclosed herein, ruggedness is not an afterthought. Rather, durability and shock resistance is a first priority (see FIG. 16). To accomplish this objective, a star compound gear train is utilized in which all bearings are held in rigid, non-moving structures. By contrast, the gear train typically chosen for this application is an epicyclic gear train, which carries three (or more) planets in a rotating cage. In such a gear train, the planets are in bearings in a cage, which then has to be supported by additional bearings. Also, the pinion angular velocity is increased in the planets, whose inertia (and that of the cage) is quite high. All of this is almost the opposite in the almost-never used SCGT. The SCGT also has the attribute of having three final stage amplifier gears driving a large diameter output internal gear to result in high structural integrity and stiffness. In addition, the short force path from the suspension arm attachments through the remarkable cross roller bearing to the output plate, to which the wheel is attached, further adds to the actuator's overall ruggedness. The result of all this ruggedness is a smaller/lighter shell structure, which is an important feature of the hub wheel drives described herein.

The SCGT is now the core embodiment in a fully interactive design process which benefits from design maps (stiffness, weight, inertia, load capacity, etc.) described in terms of pairs of governing design parameters. The SCGT contains at least 20 of these key parameters to result in numerous design maps (say, 50 or more) of importance to the final design. Making these maps visual engages the judgment of the designer, who quickly learns which trends lead to improved designs. This visual process is easily more effective than simple cost function optimization. In fact, in-depth design is feasible in minutes with continuous review (parametric tweaking) always possible.

In a preferred embodiment, the clutch is designed for maximum gear train simplicity in that the gears are always in mesh, they are all concentric about a central center line or axis, and all gear forces are symmetric about that center line or axis so as to reduce forces on the actuator shell. This results in no unbalanced or twisting forces due to off-center tangential loads. The clutch disk itself, driven by the motor, uses balls to engage ball seats in either the stage 1 or stage 2 pinions for either a reduction of 49-to-1 or 14-to-1. To do so, magnetic pulse sensors monitor the speeds of the pinions to synchronize the motor/disk angular speed with that of the engaging pinion. This engagement will be rather infrequent, thus resulting in a much lower duty cycle than that of the rest of the MDW actuator.

D. Purpose of SRM

As mentioned before, the Switched Reluctance Motor (SRM) is structurally much simpler than the brushless D.C. motor, it can operate at very high speed without undue stresses due to centrifugal forces, and it can be made up of multiple pole/phase combinations. The SRM does not currently have widespread commercial success (see FIG. 17). Efficiency is a compromise between laminate thickness (thinner results in lower hysteresis losses at higher switching frequencies) and cost (which increases rapidly as thickness goes below 0.1"). The laminated rotor may be assembled on a rugged shaft with strong bearings at each end. The life of these bearings may control the life durability of the SRM, since the SRM may need to accommodate speeds of up to 15,000 RPM in some applications. Interestingly, many existing analysis/simulation programs may use incorrect materials properties for losses at higher frequencies, voltages, currents, temperatures, and local hot spots, thus adversely affecting the torque production or efficiencies predicted by these programs. Nonetheless, the simplicity of the SRM design suggests that its cost can be continuously lowered by mass production.

The motor module may be considered a plug-on module to the two-speed SCGT of two diameters (diameter 116, 20, 24 HP and diameter 2—32, 40 HP) to further reduce cost by using the smallest minimum set of laminate/wiring combinations simply by using three lengths for the first diameter and two lengths for the second diameter. This would, then, be compatible with two shell sizes for three distinct internal SCGTs in one size and two distinct internal SCGTs for the larger size. The larger size (two SRM lengths, two SCGT torque capacities) may be higher-end systems (quality, precision, materials, bearings, etc.) for the customer who wants to pay for a better MDW.

D. MDW Development Goals

The MDW is intended to expand human choices to always respond to the customer's wants and needs (see FIG. 18). This gives the OEM a larger market potential and a larger payout by using multiple suppliers in a responsive supply chain, just as is now done in the P.C. industry. Doing so also gives the original equipment manufacturer (OEM) more income from the life cycle market (repairs and MDW updates). All of this maximizes customer choice, which will be made more frequently to give the OEM more sales (future repairs, upgrades, and reinvestment).

This approach may be successful if the OEM can establish an aggressive/responsive supply chain (in-depth certification and constant upgrades in a minimum set as a standard for investment). Doing so will always keep the OEM ahead of its competitors, where continuous performance/cost ratio increases occur. This, then, allows the OEM to meet individual customer wants/needs for efficiency or drivability on demand. All of this is predicated on the need to keep a real technical balance among the electrical, computer, and mechanical technologies. Lack of technical balance is predicted to cause a failure in the market for the imbalanced Protean hub wheel drive with its emphasis on apparent simplicity (too much electrical technology and inadequate mechanical technology). It should be noted that present SRM technologies tend to generate some noise and ripple, all of which may be managed by intelligent (performance map based) decision level software.

E. Marketing Strategy

FIG. 19 provides a first-level strategy to move the MDW into the market place and to ensure leadership over its competitors into the foreseeable future. Here, the primary issue is to always maximize human choice at the time of initial purchase (choose from a small set of highly certified MDWs), during operation (drivability or efficiency), and during maintenance (plug-and-play MDW repair and updates) using modern decision making software to assist the operator at all times. In order to stay ahead of the competition, basic customer needs must be reviewed and updated at all times, with emphasis on general urban and highway duty cycles, individual customer demand cycles, and customer guidance on how to enhance durability, efficiency, drivability, and safety. This leads to the need to make continuous performance-to-cost improvements of a minimum set of MDWs to meet customer wants and needs as indicated from continuous market reviews. This may be achieved by continuous tech improvement/testing of all MDW components (clutch, gear train, bearings, materials, motor, brakes, controller, sensors, operational software, etc.). Operational software for the MDW will continuously evolve (just as operating system software evolves through updates) to better meet customer needs for safety in emergency conditions, impact of weather, traffic conditions, and other such factors.

Finally, this recommended continuous tech development will create many advances ahead of market needs. These should be held in reserve to be able to always respond to the market as rapidly as possible to create the image of continuous progress (brand identity) and to always stay ahead of the competition.

XI. Shortest Possible Actuator Force Path

A. Objectives

Actuators must act to resist forces and deformations in all directions in order to become not only torque generators, but also mechanical joints in an active system (car hub-drive wheels, joints in robot manipulators, control surfaces for aircraft and ships, construction machinery, etc.). The shortest path between one link attachment in the system and the next is importanty to reduce effects of deformation, temperature, tolerances, and to reduce weight, volume, and cost. These effects, and suitable means of achieving a shortest force path, are described, for example, in U.S. Ser. No. 14/195,603 (Tesar), entitled "Rotary Actuator With Shortest Force Path Configuration", which is incorporated herein by reference in its entirety. It will be appreciated that the application of shortest force path concepts to MDWs thus represents a particular field of use of the concepts set forth in the foregoing '603 application.

B. Background

Until recently, actuators were used primarily as torque generators to drive a joint which contained its own bearings in separate housings to resist forces in all other directions, not including the driving torque about the joint center line. This means that the separate joint housings and bearings added significant complexity, weight, volume and cost to the resulting driven joint. Approximately twenty-five years ago, researchers at the University of Texas began integrating the joint bearings into the actuator. It became possible to use one principal bearing to not only be the joint bearing but also the key bearing in the last gear reduction in the actuator (always associated with the last gear being an internal gear), dramatically simplifying the system structure, reducing weight and volume, and reducing cost. This then allowed plug-and-play of standardized actuators, and assembly of the system on demand.

C. Example Actuator

Figure 20:
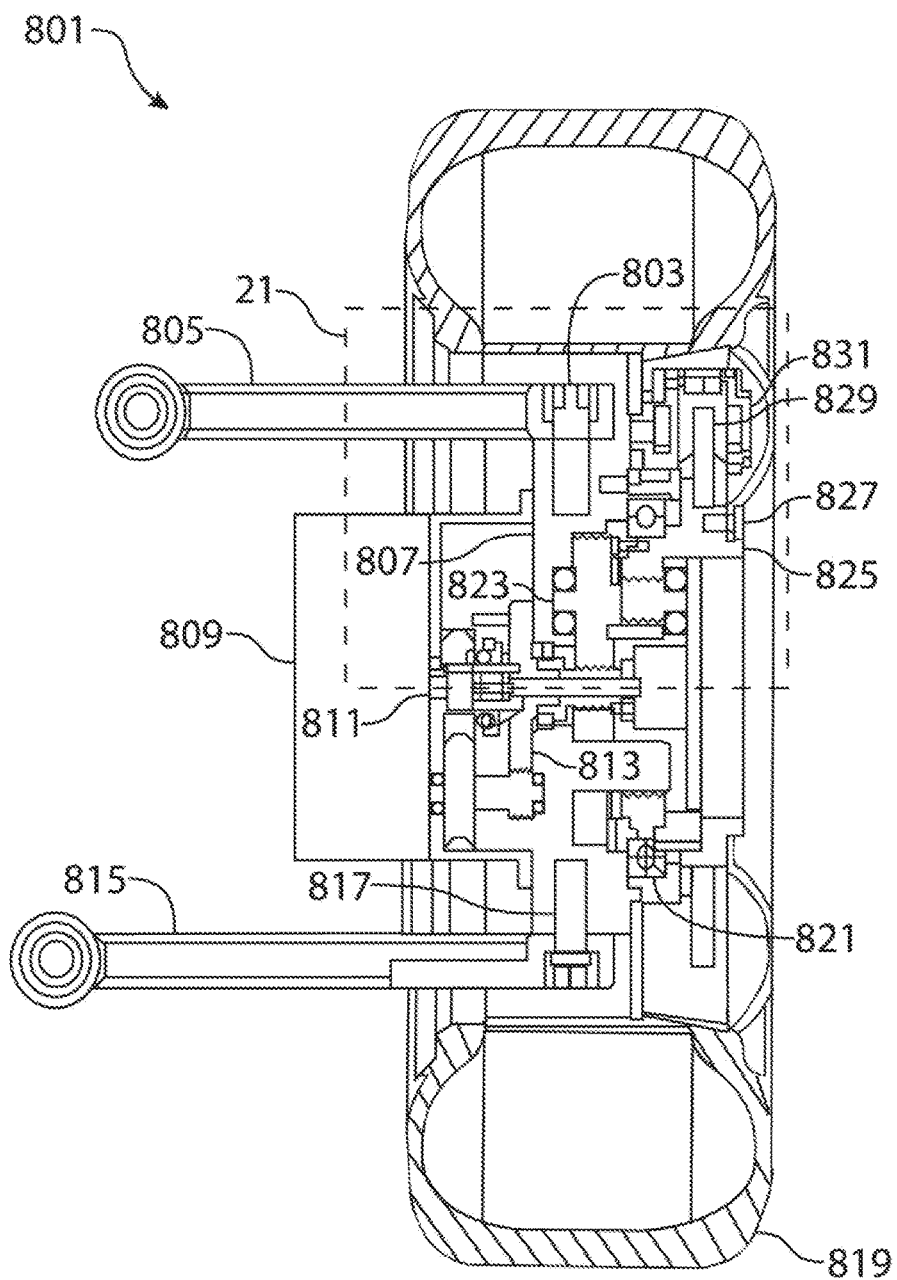
FIG. 20 is an illustration, partially in section, of an MDW wheel suspension geometry.

Recently, the University of Texas has pursued extensive design of a multi-speed hub drive wheel for automobiles (see FIG. 20). This wheel drive is made up of a low cost switched reluctance motor with a reconfigurable power supply. The combination provides an efficiency regime (smooth, quiet) and a drivability regime (acceleration, climbing traction) for essentially two distinct electrical speed ranges. The speed of this motor may exceed 15000 RPM for highway operation. The desired wheel speeds for city driving is 300 to 500 RPM and that for highway driving is 1000(+) RPM. This requires a gear reducer to provide two speed ranges and, therefore, reduce the size of the motor. The gear reduction is either 14-to-1 or 49-to-1 with a clutch to select the speed ratio through gears which are always in mesh. The reducer is in two stages, a 3.5-to-1 front end (including the clutch) and a 14-to-1 back end. Both are star compound gear configurations which are exceptionally rugged and, therefore, light weight; all bearings are in fixed structures, all high speed bearings are small in diameter to reduce friction losses, and a strong backbone structure separates the front and back ends to create a shell which is unusually rigid.

D. Shortest Force Path

A basic principle in plug-and-play actuators is to ensure the shortest possible structural distance between a reference attachment (in this case, the control arm attachment boss) and the output plate (in this case, the wheel bolt ring). This path is labeled as A-B-C in FIG. 21. The force path passes through the principal bearing B. In this case, use of a cross roller bearing is desirable because of its exceptional load carrying and stiffness capacity in all directions. This one bearing also acts as the principal bearing in the last plane of the back end star compound gear train. Clearly, the force path A-B-C goes through stiff circular structures A and C. The cross roller bearing B is also very stiff. Hence, this short force path is believed to reduce deformation, permit significant weight reduction, reduce the effects of temperature and manufacturing tolerances, and also permit reduced volume (which is critical in this case since the actuator must fit inside the car's wheel geometry).

This short force path is directly associated with the strong backbone of the actuator, which prevents the circular structure (A and C and the cross roller bearing B) from becoming oval under load. This provides improved or optimal protection of all gear meshes (alignment), bearings, clutch, and other such components from undesirable external shocks from the wheel or suspension. Also, the motor is carefully isolated from these shock effects to protect its air gap. Hence, this shortest force path concept is an important consideration in this and most other actuator applications (see FIG. 22).

XII. Two Speed MDW Ball Clutch (Embedded in First Stage Gear Train)

B. Background

Initially, the design for the Multi-speed Drive Wheel (MDW) was intended for relatively low speed applications for field robots in on/off-road operations, where speeds up to 30 mph may be considered. However, it has become clear that the MDW may be used for a variety of other applications such as, for example, automobiles, construction systems, heavy battlefield vehicles, farm machinery, and the like. In some cases, speeds of operation may exceed 70 mph, which then raises concern for unsprung mass for maintenance of maneuverability with a required level of safety. This consideration suggests that the weight of the MDW should be as low as possible, which would likely require the electric motor to operate at higher speeds (say 15,000 RPM) to get to 70 mph. This, in turn, would require a total reduction ratio of 45-to-1 up to 60-to-1. Using the simplest possible gear train (the star compound) requires two stages. Since it is desired that the second stage be as standard as possible (it carries a high level of torque), any variability in the design should occur in the first stage star compound gear train.

The foregoing notwithstanding, the requirements of drivability (acceleration, smoothness, emergency maneuvers, etc.), and those of efficiency and quietness, cannot all be met at one operating speed regime. Hence, the MDW requires two mechanical and two electrical speed regimes. The following discussion concentrates on the two mechanical speeds which requires a changeover from, say, 14-to-1 (for high speed) and up to 45-to-1 (for high acceleration and traction) at the low speed regime. It is very desirable to make this speed change without disturbing the basic operation of the vehicle (i.e., down shifting while at higher speeds).

D. Clutch Operation

An important aspect of the clutch operation is to ensure that the disk and the gear are driven are at the same speed. The motor and the vehicle wheel will use low cost speed sensors. It will be desirable to up or down shift as quickly as possible. This requires that the motor first be disengaged from either gear, which can happen at any speed. It is desirable that the motor torque go to zero before the shift disk is disengaged. To go from the end of the low wheel speed regime (high motor speed) to the beginning of the high wheel speed regime will require that the motor speed drop, say from 15,000 RPM to 5000 RPM to engage the first stage final gear. This process may be automated as a standard procedure in the MDW controller. Going down from high wheel speed to low speed would reverse this process. It is conceivable that the shift could occur at a motor speed of 15000 RPM if a quick down shift is essential. The question of using the MDW as a brake would affect this shift process. It is, then, possible to slow the vehicle in high gear down to 5000 RPM motor speed, and then down shift for maximum braking force and control from 5000 RPM on down to zero speed.

Clearly, matched speed for engagement is essential. It is possible to embed a magnetic timing sensor in the first stage backbone which would pick up magnetic pulses in both the rotor and the pinion gear to ensure that their speeds are matched before engagement. The balls are forgiving if the speed differential is low. Disengagement is much less critical and may be achieved much more quickly. All of these choices may be embedded in the MDW electronic controller and prioritized based on the road conditions or the driver's objectives. All of this maximizes individual wheel control, which has been shown in commercial ABS braking systems to provide superior results. Similar results may now be expected using intelligent decision making in the MDW for preserving traction and maneuverability, while accelerating the vehicle to enhance safety during all operating conditions of the vehicle.

XIV. Dual Synchro for MDW Star Compound Front End

A. Objective

The following discussion addresses how to use a proven synchro mesh technology to provide a clutch action between high speed and low speed (low ratio and high ratio) operation of the MDW, replacing the function of a ball clutch in some earlier design concepts. The system benefits from a large diameter/thin cross-section prime mover (say, a stepping motor) driving a 10 to 1 screw to then drive a shift disk to drive a yoke controlling the clutch disk.

B. Background

The clutch featured in some earlier designs uses ball/sockets to engage either the frontend pinion ($r_1$) or the final gear ($r_4$) of the frontend drive train. This is accomplished by matching the necessary gear speed (either $r_1$ or $r_4$) to meet the required speeds derived from the ongoing wheel speed. This is achieved by commanding the prime mover to accelerate (or decelerate) the clutch disk that carries the balls in its two faces. This speed matching depends on precise sensor information on both the wheel and prime mover speeds. Fortunately, the ball clutch is forgiving and will compensate for a small mismatch in the speed of the clutch disk and the engaging gear.

Also, the clutch actuator lies at the downstream end of the gear system and must use a rather complex combination of push rod and radial spider bands to control the position of the clutch disk. This leads to some need for precision and careful assembly.

C. Alternative Dual Synchro Clutch:

In Sec. XV, it is shown (in FIGS. 31 and 32) how to use a pair of synchro mesh clutches to switch from a star compound configuration (stopping a gear cage) to an epicyclic configuration (stopping a ring gear) to provide two distinct reduction ratios with a ratio step of between 3 and 4×. This proven synchro technology, which represents an earlier concept, is used herein to replace the ball/socket clutch with a pair of synchro mesh gear assemblies. The goal is to assist the prime mover to more rapidly and more precisely achieve a velocity match between the clutch face gear and the corresponding meshing teeth embedded in the gear to be engaged.

D. Proposed Clutch Configuration

Figure 29:
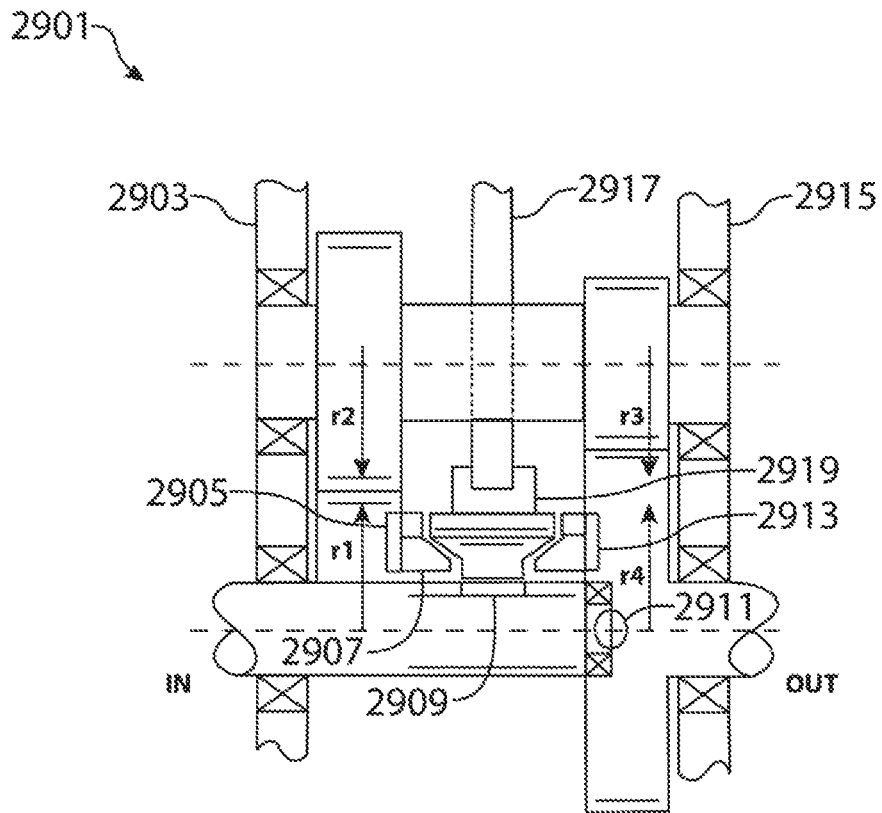
FIG. 29 is an illustration of a dual synchro for an MDW star compound front end.

In FIG. 29, the layout is provided of a standard front end star compound gear train with $r_1$ meshing with $r_2$ and $r_3$ meshing with $r_4$. The friction cones are carried by a drive which is splined with the drive shaft from the prime mover. Moving this spline to the left engages a friction cone attached to gear $r_1$ (not attached to the drive shaft) which then matches central spline cones' velocity with gear $r_1$ (with help from the prime mover) to permit the face gear teeth to engage. This, then, provides a frontend reduction ratio of $g_f = r_1 r_3 / r_2 r_4$. Moving the spline to the right engages the right friction cone to match speeds with gear $r_4$ which, then, permits the face gear teeth on the clutch and gear $r_4$ to mesh to carry the required load. In this case, the prime mover shaft and the gear $r_4$ rotate at the same speed, giving no reduction (i.e., g=1). Further details of the clutch configuration may be found in U.S. Ser. No. 14/500,971, entitled "Gear Train and Clutch Designs for Multi-Speed Hub Drive Wheels", now U.S. Pat. No. 9,365,105 (Tesar), which was filed on Sep. 29, 2014, and which is incorporated herein by reference in its entirety.

Figure 32:
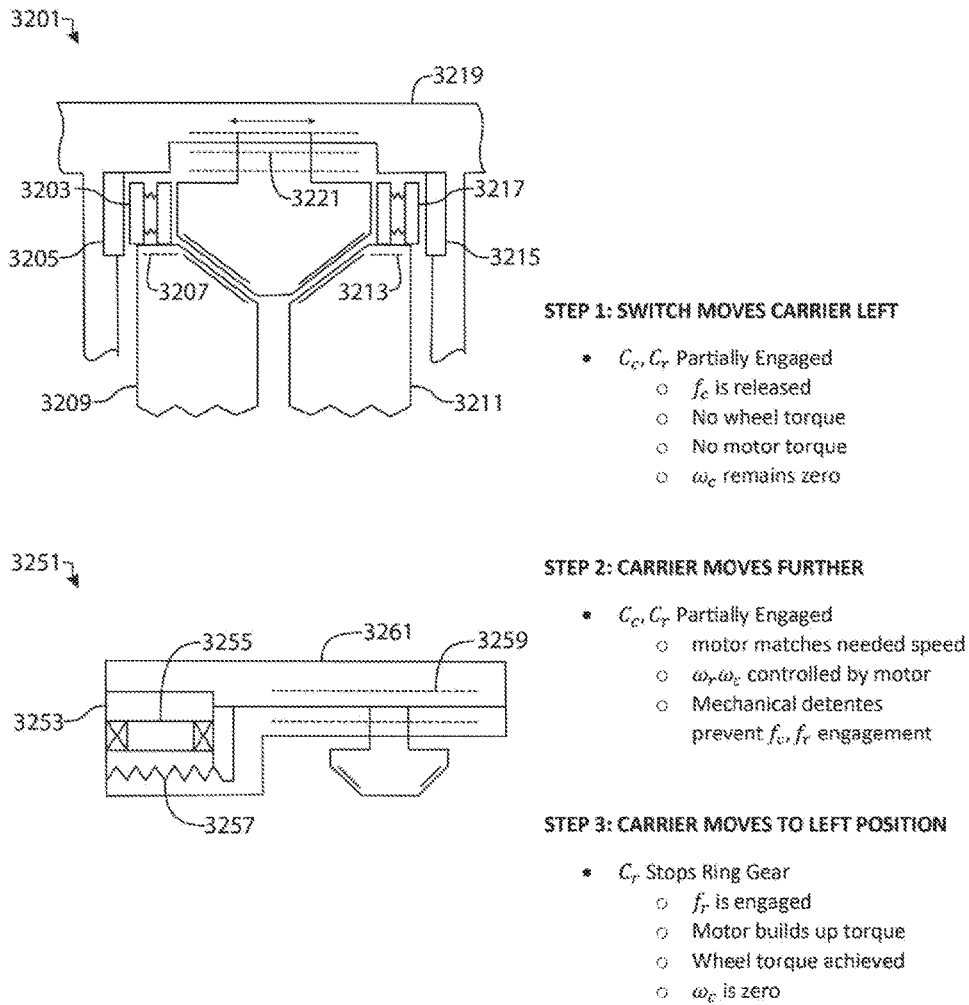
FIG. 32 is an illustration of a dual synchro/switch actuator for an MDW.

FIG. 32 depicts the use of a large diameter/small cross-section motor/screw assembly to actuate a dual coned clutch. Although this is typically a lower priority consideration in most applications, a similar arrangement may be utilized is used here where the screw cylinder would drive a non-rotating shift disk which is coupled to a yoke to control the position of the clutch disk. Note that the shift disk must be inserted before the front end gears are mounted to give the gear assembly sufficient clearance to prevent contact with the shift disk.

XV. Simplified Two-Speed Reducer for MDW (Preferred)

A. Objective

The goal is to further simplify, enhance performance, reduce weight, and reduce cost for the electric Multi-speed hub Drive Wheel (MDW). This may be achieved by using dual synchro clutches to engage two unique flow paths through a star compound/epicyclic gear train with ratios of 9 and 38 to 1 (a speed change of almost 4) or of 4.3 and 13 to 1 (a speed change of almost 3.0). Further reduction of 4 to 1 or more may be achieved using a rugged single plane back end star compound gear train.

B. Background

The principal advantage of a 2-speed gear set is that the unit can be operated as close as possible to the efficiency "sweet spot" of the motor torque/speed map. Previous MDW designs developed at UT used only star compound gear trains because of their exceptional features of efficiency, low inertia, ruggedness, and low cost. The front end star compound had a reduction ratio in the range between 3 and 4 to 1, with the back end having a ratio range of 12 to 20 to 1. To obtain the speed change, a clutch was necessary to engage/disengage the first and second gears along the center line of the front end gear train. Unfortunately, this clutch is somewhat difficult to actuate. Also, the backside amplifier gears of this star compound reach 3× the speed of the prime mover (say, at 15,000 RPM) when only the second gear in the front end is driven.

C. Reduced Complexity Front End

Figure 30:
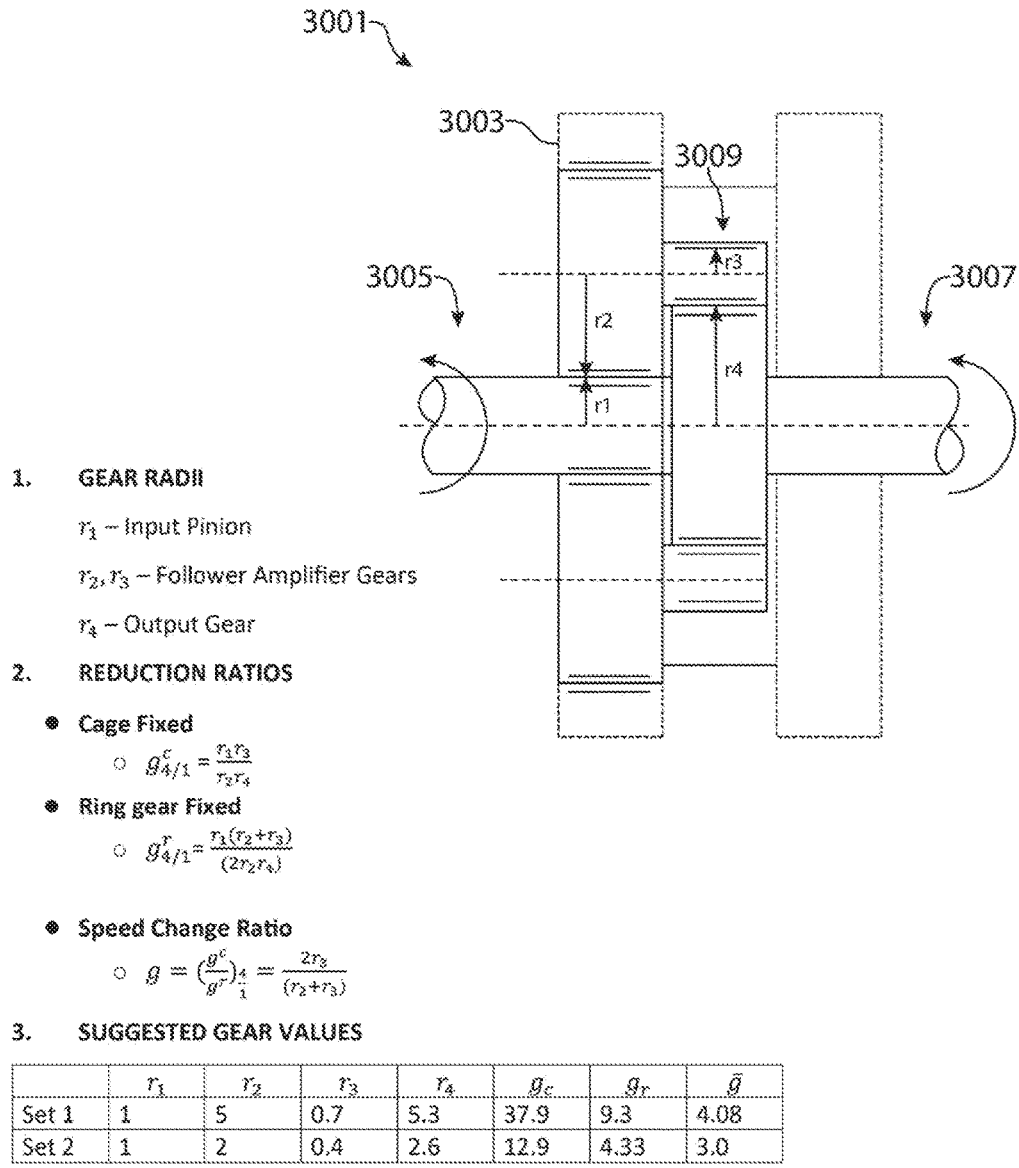
FIG. 30 is an illustration of a simplified two-speed reducer for an MDW.

FIG. 30 illustrates the basic configuration of the proposed switchable front end where no driven gear rotates at a speed higher than 50% of the motor speed. In this case, gear 1 ($r_1$) drives gear 2 ($r_2$) with a ratio of $r_1/r_2$. Gears $r_2$, $r_3$ form an amplifier gear between input pinion 1 and output gear 4 ($r_4$). This system of gears can be switched by holding either the ring gear or the cage fixed while the other rotates as part of the gear mesh flow pathway. If the cage is fixed, the gear ratio is:

$$g^c_{4/1} = \frac{r_1 r_3}{r_2 r_4} \qquad \text{(EQUATION 1)}$$

If the ring gear is fixed, the gear ratio is:

$$g^r_{4/1} = \frac{r_1(r_3 + r_3)}{2\pi r_2 r_4} \qquad \text{(EQUATION 2)}$$

The associated speed change ratio is then:

$$\bar{g} = (g^c/g^r)_{4/1} = \frac{2r_3}{r_2 + r_3} \quad \text{(EQUATION 3)}$$

Two suggested design sets are:

|       | $r_1$ | $r_2$ | $r_3$ | $r_4$ | $g_c$ | $g_r$ | $\bar{g}$ | $g_{c/1}$ | $g_{r/1}$ |
|-------|-------|-------|-------|-------|-------|-------|-----------|-----------|-----------|
| Set 1 | 1     | 5     | 0.7   | 5.3   | 37.9  | 9.3   | 4.08      | 1/12      | 1/11      |
| Set 2 | 1     | 2     | 0.4   | 2.6   | 12.9  | 4.33  | 3.0       | 1/6       | 1/5       |

These are very respectable numbers. The main issue may be the ratio of r4/r3, which should not go above 7 to 1.

FIG. 31 provides a more detailed layout for the structure and necessary bearings. The system lies between two shell frames holding bearings for the input and output shafts. These coaxial shafts (turning at different speeds) are mutually supported by a simple bearing ball (to help maintain their alignment and reduce interface friction). The cage then rotates on each of these shell supported shafts. Amplifier gear $r_2$, $r_3$ is mounted in bearings at each end held by the cage. Finally, the ring gear meshes with gear $r_2$ and rotates on bearings on the outside of the gear cage.

D. Synchro Clutch Design

The primary function of the synchro clutches is to hold either the cage or the ring gear stationary while the other rotates. Obviously, both cannot be stationary or the system will be locked. The synchros are actuated by a large diameter small crossection BDC (or stepper) motor whose rotor drives a large diameter screw which then drives a ring parallel to the gear train axis to move the synchro friction cones (see FIG. 32) to the left (or right) to engage the ring gear (i.e., it stops) or the cage (i.e., it stops).

The clutch switch actuator (see FIG. 32) drives a shell spline ring (which does not rotate) to the left or right. Suppose the cage is engaged (stopped) by its stationary face gear (on the right). These face gears all have the bevel tooth shapes and blocking rings of normal synchro meshes. Here, however, friction assists the switching under the programmed control of the clutch actuator enabling much faster and more reliable action. Fortunately, the ring and cage speeds are very low and very similar for each of the reference sets (in this case, $g_{r/1}$, $g_{r/2}$=1/5, 1/6 for Set 1 and 1/11, 1/12 for Set 2). This means their relative switching velocities are very small.

Moving to the left first reduces pressure on the face gear $f_c$ and partially disengages cage cone $C_c$. The MDW motor is not producing any torque during the switching sequence. The motor begins to change its speed to match the desired speed change (approximately 3× or 4× in Sets 1 and 2). The clutch switch actuator now moves towards the central position to release $f_c$ and begin to stop $f_r$ by means of its friction cone $C_r$. Note that, in this location, neither $f_r$ or $f_e$ are engaged (which is prevented by detents in the switching collars). Finally, the clutch switch actuator moves to its resting place on the left to engage the ring face gear $f_r$ (it is stopped by friction cone $C_r$) and to completely release the cage face gear $f_c$. Once $f_r$ is engaged (confirmed by a local sensor), the MDW motor builds up the required torque to drive the wheel. Now, to release $f_r$ and engage $f_c$, this process is reversed.

E. Unique Performance Features

The reality of this simplified design is that its function is met by stopping either the cage (including the attached gears) or the ring gear. Stopping is much more forgiving than matching speeds in high velocity gearing. Also, the angular velocity of the ring or cage is relatively low (1/6 to 1/12 the angular speed of the prime mover). The ring gear has very little mass, so it can be stopped with a relatively small cone clutch. The cage has considerable mass (say, with a radius of gyration at the amplifier gear centerline plus about 20% for the effective inertia of the gears) with a 50% linear velocity of the velocity of the input pinion gear teeth. For a normal design, a reasonable synchro/cone size can stop the cage in 0.2 sec. This makes possible a total switching time of not more than 0.3 sec., which is 2 to 3× faster than normal synchro switching speeds. Of course, the synchro cone sizing must be designed to meet the actual system mass, speed, switching time, durability, etc. Note that the large friction cone diameters generated a proportionally larger friction force with a large torque producing radius; i.e., the torque is proportional to $d^2$.

XVI. Complete MDW Architecture (from One to Four Mechanical Speeds)

A. Objective

An expanded architecture is provided for electro-mechanical hub drive wheels from single speed up to four mechanical speeds in order to best match a wide variety of application requirements from lightweight vehicles (motorcycles, smart cars, modular reconfigurable cars, high efficiency and high drivability cars) to heavy off-road vehicle systems in construction, farming, and in the battlefield. In each application, the goal is to arrive at a minimum set of wheel drive modules (say, 3 to 5) in order to continuously improve performance to cost ratios.

B. Single Speed Hub Drives

Figure 3:
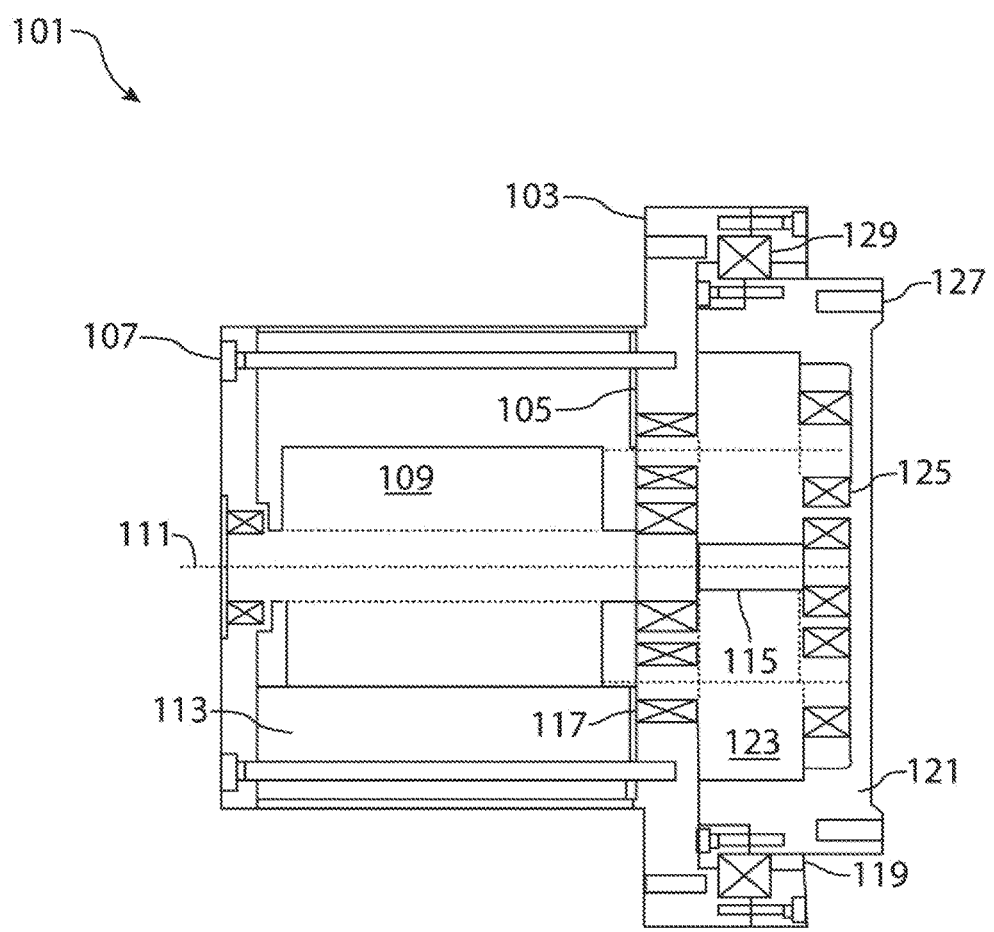
Figure 4:
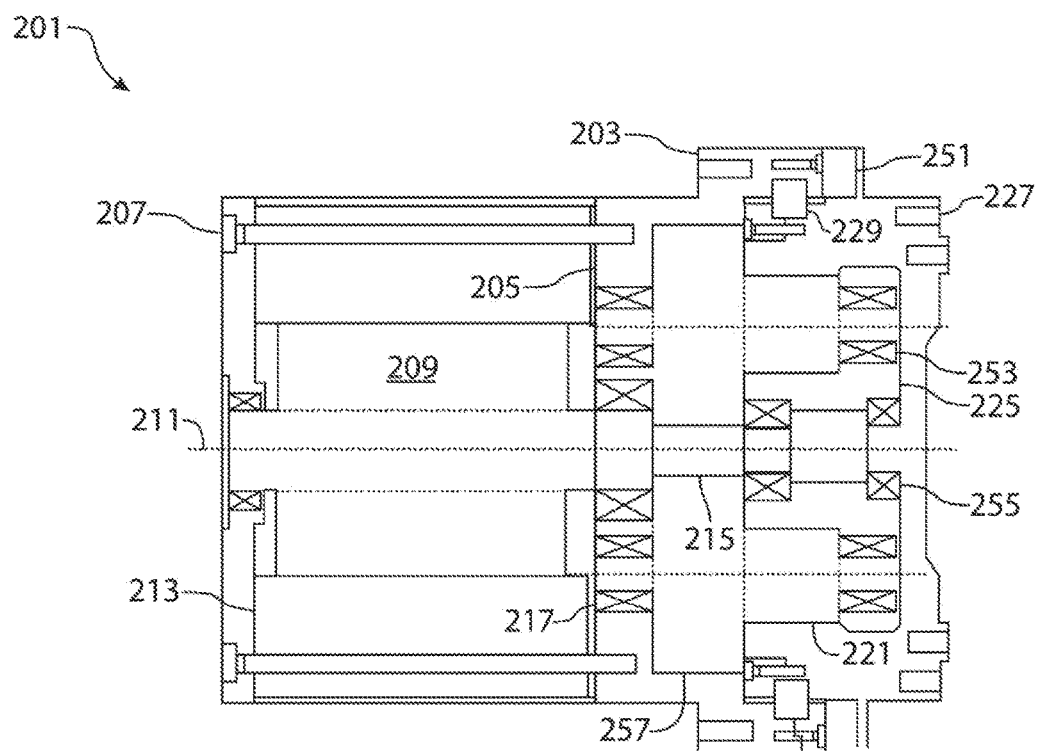

As described in Section III-V, the best single speed reducer for hub wheel drives is the star compound (SC) gear train. FIG. 3 describes a single plane SC with a reduction ratio of 3 to 5 to 1. FIG. 4 lays out a two plane SC with amplifier gears to provide useful ratios of 15 to 20 to 1. The use of a single plane frontend SC and a single plane backend SC is proposed herein for a reduction ratio of 9 to 25 to 1 in an exceptionally rugged configuration. A single plane frontend SC and a two plane backend SC (see FIGS. 3 and 4) is also proposed to achieve an overall reduction ratio of 45 to 100 to 1. Finally, for very high reduction ratios, a two plane frontend and backend (Sec. II, FIG. 5) is proposed to obtain ratios of 300 to 500 to 1.

C. Two Speed Hub Drives

The use of a frontend SC with a clutch (see FIG. 8) leads to an MDW with a two plane frontend SC and a two plane backend SC with representative speed reductions of 14.3 to 1 and 49 to 1 (a ratio speed change of 3.5 to 1)). For a 2 ft. diameter wheel at 1000 RPM, this gives a top speed of 70 mph with a prime mover top speed of 14,300 RPM. The speed change of 3.5 to 1 allows the prime mover to remain near its operating efficiency sweet spot as much as possible (and using a reconfigurable controller) to reduce energy losses by 2× (and, in the future, by 3×) to dramatically improve efficiency and reduce temperature-related cooling issues.

FIGS. 30-32 describe another unique reduction configuration which is denoted as a Dual Caged/Star Compound (DC/SC) gear reduction system. It uses a dual synchro mesh clutch to hold either a ring gear stationary allowing the gear cage to rotate, or to hold the gear cage stationary, allowing the ring gear to rotate. Representative gear radii provide reduction ratios of 9.3 to 1 and 38 to 1 with a speed change ratio of 4 to 1. Other ratios are 13 to 1 and 4.33 to 1 with a speed change of 3.0 to 1. Each of these could be augmented by a one plane SC backend to give ratios of 45 to 180 to 1 or a two plane SC backend to give a total ratio set up to 180 to 800 to 1 for very high draw bar pull, if desired. For the second case, (13 to 1, 4.3 to 1), these total ratios would be 20 to 65 to 1 or 60 to 195 to 1.

D. Four Mechanical Speed MDWs

Now it is possible to use two clutched SCs in series or two DC/SC in series to provide a total of four mechanical speeds. It appears now that the DC/SC would be best used as a frontend and the SC as a backend for light on-road vehicles. Suppose the SC was 10 and 3 to 1 and the DC/SC was 9 and 4 to 1. This would result in ratios of 90, 40, 27, and 12 to 1. For a 15,000 RPM motor and a 2 ft. diameter wheel, this would represent speeds of 87.5, 39, 26, 12 mph, which appears to be a very useful spread.

For off-terrain vehicles with a 3 ft. diameter tire, a similar set of ratios for a recommended SI frontend and DC/SC backend would give:

| Ratio | 6000 RPM Motor | 9000 RPM Motor |
|---|---|---|
| 96 | 6.6 | 10 mph |
| 36 | 17.5 | 26 mph |
| 24 | 26 | 39 mph |
| 9 | 70 | 105 mph |

These values may provide a very useful set of choices for on and off-road operation.

The various components of the embodiments disclosed herein may be further understood with reference to the following detailed descriptions.

FIG. 3 is an illustration of an embodiment of an actuator 101 which utilizes a one-stage compound gear train (and using single plane helical gears). The actuator 101 is equipped with a shell attachment 103, a backbone structure 105, a motor attachment bolt 107, a rotor 109, a rotor shaft 111, a stator 113, an input pinion (R5) 115, a gear bearing 117, a seal 119, an internal output gear 121, a stationary star gear 123, a bearing cage 125, an output attachment plate 127 and a principle bearing 129.

FIG. 4 is an illustration of an embodiment of an actuator 201 which utilizes a one-stage star compound gear train (and using amplifier gears in a second plane). The actuator 201 comprises a shell attachment 203, a backbone structure 205, a motor attachment bolt 207, a rotor 209, a rotor shaft 211, a stator 213, an input pinion (R5) 215, a gear bearing 217, an internal output gear 221, a bearing cage 225, an output plate attachment 227, a principle bearing 229, a seal 251, an amplifier gear bearing 253, an output support bearing 255, and an amplifier gear 257.

Figure 5:
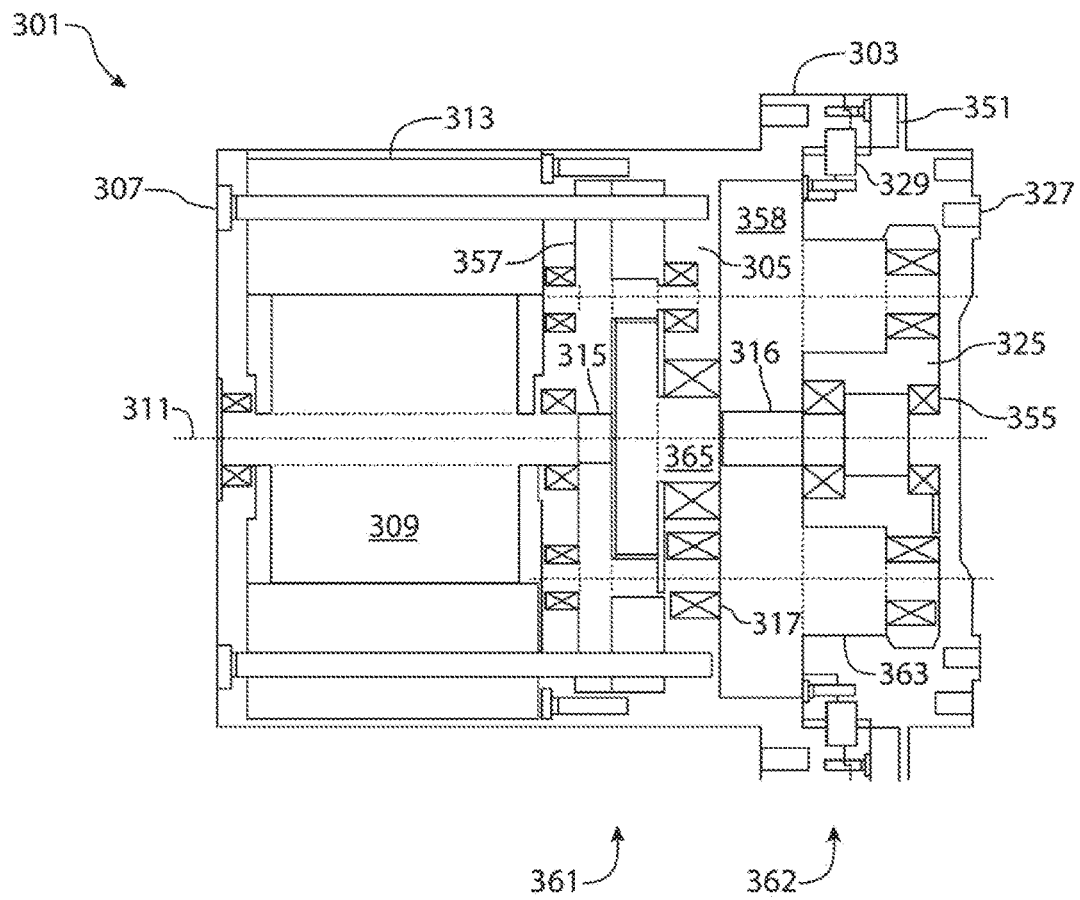

FIG. 5 is an illustration of an embodiment of an actuator 301 which utilizes a two-stage compound gear train (in a coffee can configuration). The actuator 301 comprises a shell attachment 303, a backbone structure 305, a motor attachment bolt 307, a rotor 309, a rotor shaft 311, a stator 313, an input pinion (R5) 315, a second stage input pinion 316, a bearing cage 325, an output plate attachment 327, a principle bearing 329, a seal 351, an amplifier gear bearing 353, an output support bearing 355, a first stage amplifier gear 357, a second stage amplifier gear 358, a first stage gear train 361, a second stage gear train 362, a circular arc gear mesh 363, and a first stage output gear 365.

Figure 6:
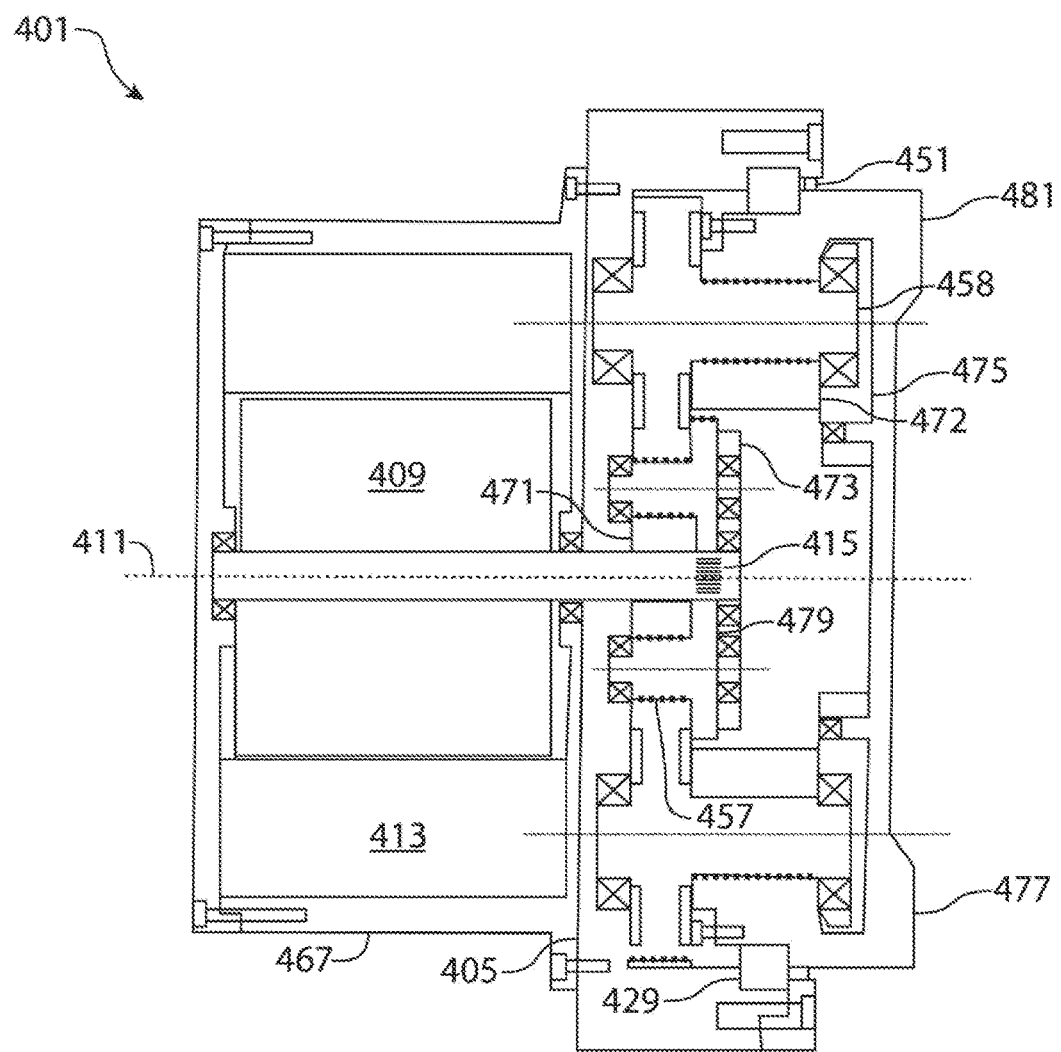

FIG. 6 is an illustration of an embodiment of an actuator 401 which utilizes a two-stage pancake star compound actuator (with the motor in series with the gear train). The actuator 401 comprises an actuator backbone 405, a rotor 409, a rotor shaft 411, a stator 413, a first stage input pinion 415, a principle cross-roller bearing 429, a seal 451, a first stage amplifier gear 457, a second stage amplifier gear 458, a shell 467, a first stage bridge 471, a second stage bridge 472, a first stage cage plate 473, a second stage cage plate 475, an output plate 477, a first stage star gear 479, and an output internal gear 481.

Figure 7:
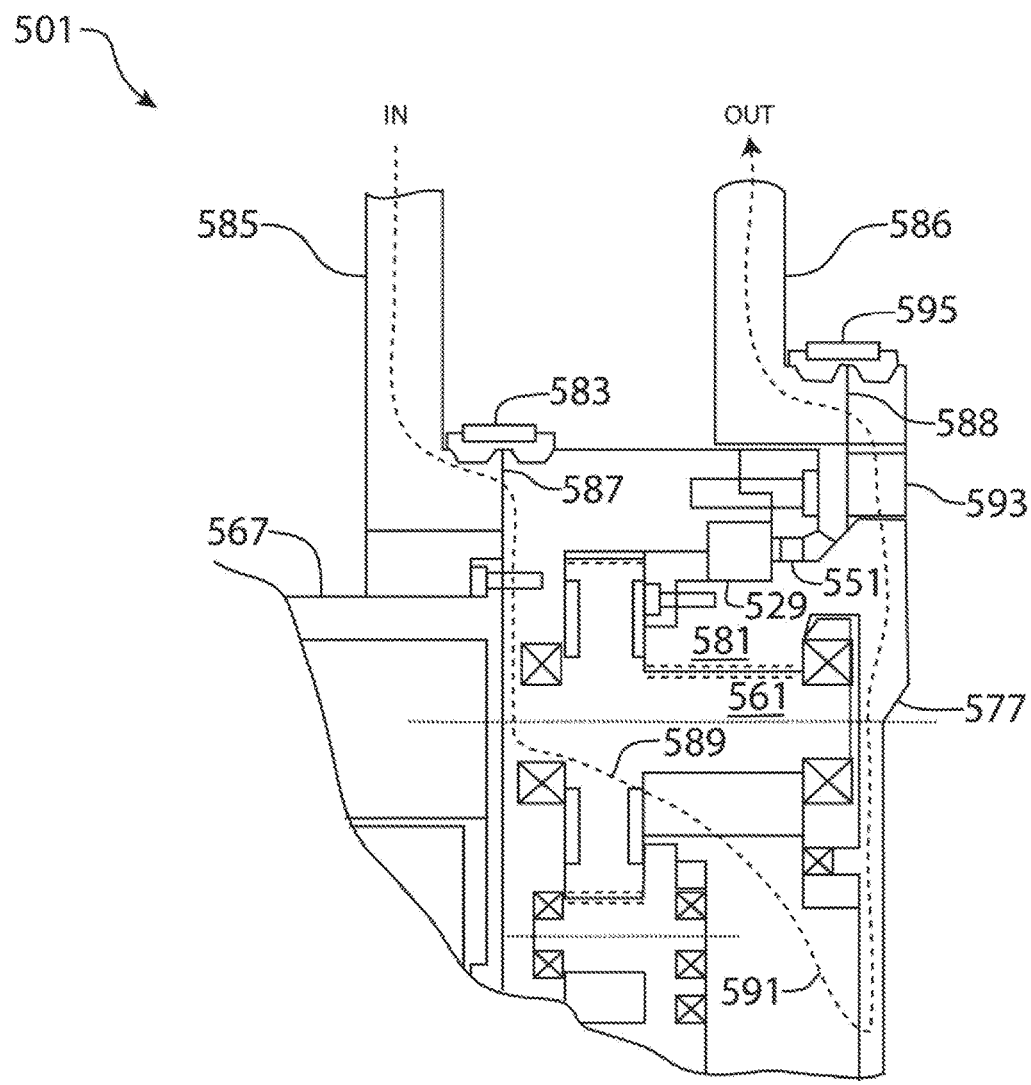

FIG. 7 is an illustration, partially in section, of an embodiment of an actuator which utilizes a two-stage star compound gear train 501 and quick-change attachments. The actuator 501 comprises a principal bearing 529, a seal 551, a two-stage gear train 561, an actuator shell 567, an output attachment plate 577, an output internal gear 581, a first toggle and clamp 583, a first link 585, a second link 586, a first interface 587, a second interface 588, a wiring pathway 589, a wire coil 591, a torque sensor 593, and a second toggle and clamp 595.

Figure 8:
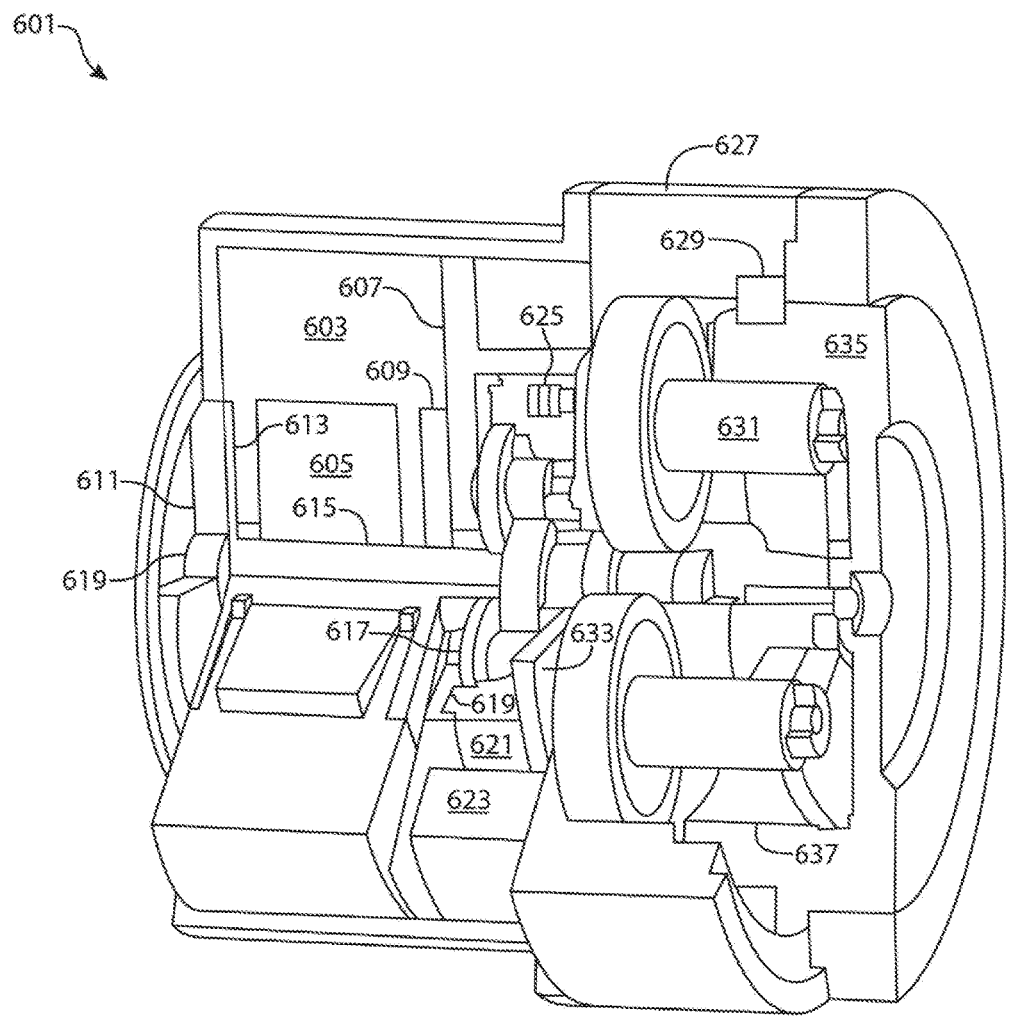
FIG. 8 is an illustration of an embodiment of an actuator, partially in section, which is equipped with a two-speed wheel drive.

FIG. 8 is an illustration of an embodiment of an actuator 601, partially in section, which is equipped with a two-speed wheel drive. The actuator 601 comprises a stator 603, a rotor 605 equipped with a clutch rotor 607 and clutch disk 609, a parking brake solenoid 611, a brake disk 613, a motor shaft 615, a first stage compound gear train (about 4 to 1) 617, clutch friction pads 619, a clutch spline 621, a clutch energizing coil 623, a clutch return spring 625, a frame attachment 627, a principal cross-roller bearing 629, a second stage star compound gear train (about 15 to 1) 631, h friction pads 633, a wheel attachment 635, and an output internal gear 637.

Figure 12:
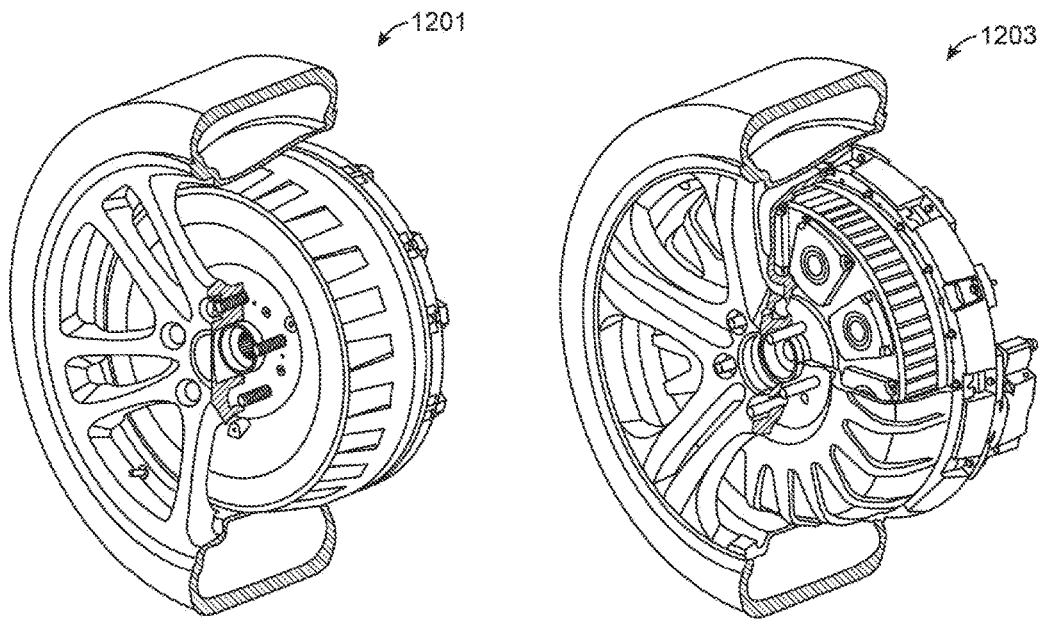
FIG. 12 is an illustration, partially in section, of the PROTEAN® electric drive.
Figure 13:
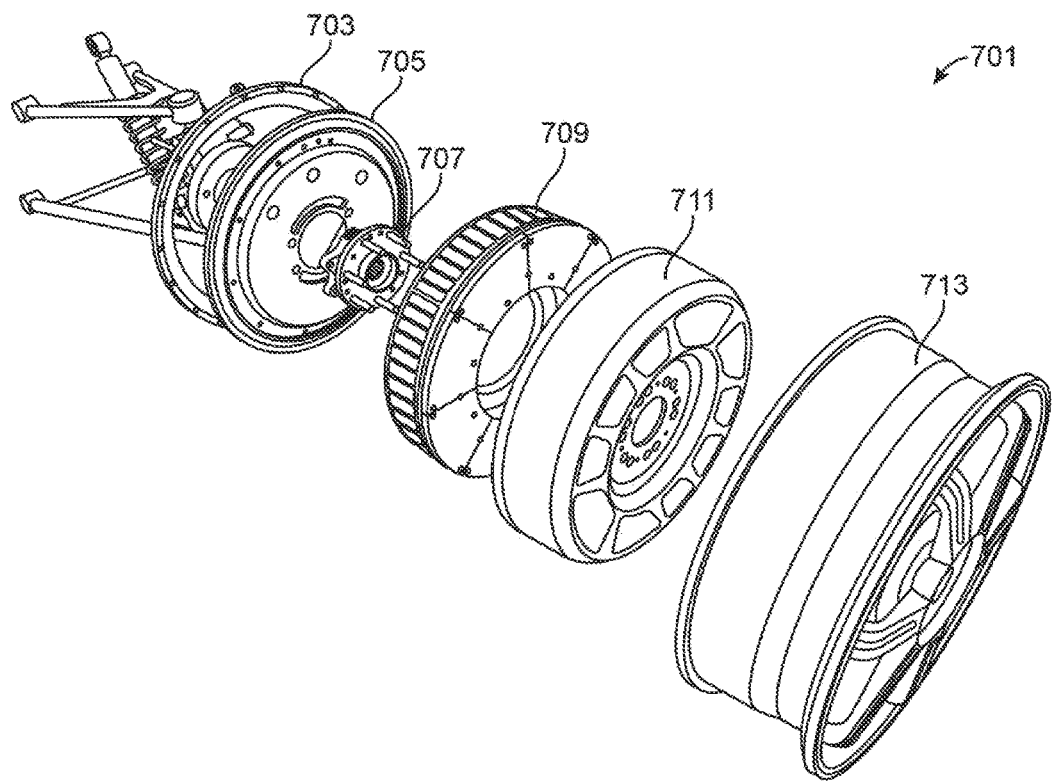
FIG. 13 is an exploded view of the PROTEAN® electric drive of FIG. 12.

FIG. 12 is an illustration, partially in section, of the PROTEAN® electric in-wheel hub drive 1201. An exploded view of thus hub drive is shown in FIG. 13, where it is seen that the hub drive comprises a gear train 701, a seal 703, a hub plate 705, axle bearings 707, an internal stator 709, an external drum rotor 711, and a wheel 713.

FIG. 14 is an illustration, partially in section, of the wheel suspension geometry of an MDW 801 in accordance with the teachings herein. The MDW 801 comprises an upper ball joint 803, an upper control arm 805, a gear train backbone 807, a motor 809, a clutch with neutral 811, a first stage star compound gear train (3.5:1) 813, a lower control arm 815, a lower ball joint 817, a tire 819, a principal cross roller bearing 821, a second stage star compound gear train (14:1) 823, an output internal gear 825, a wheel attachment 827, a vented brake disc 829, and an electronic wedge brake 831. FIG. 20 is identical to FIG. 14.

Figure 21:
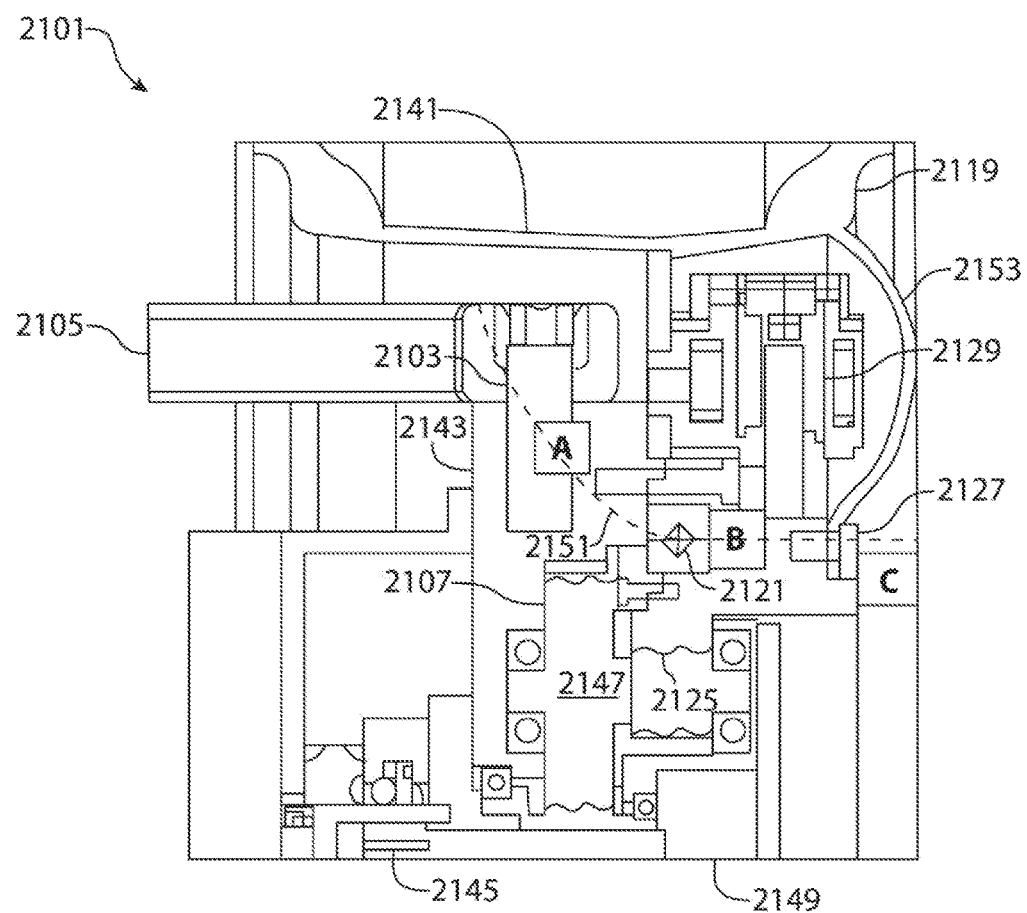
FIG. 21 is an illustration showing the short force path in the MDW wheel suspension geometry of FIG. 20.

FIG. 21 is an illustration showing the short force path 2151 in an MDW 2101 having a wheel suspension geometry of the type depicted in FIG. 20. The MDW 2101 comprises a ball joint (A) 2103, a control arm 2105, a gear train backbone 2107, a tire bead 2119, a principal bearing (B) 2121, an output internal gear 2125, a wheel attachment (C) 2127, an electric brake 2129, a wheel rim 2141, an attachment boss 2143, a gear train front end with a clutch 2145, a heavy-duty gear train back end 2147, a back-end bearing cage 2149, and a wheel disk 2153.

Figure 24:
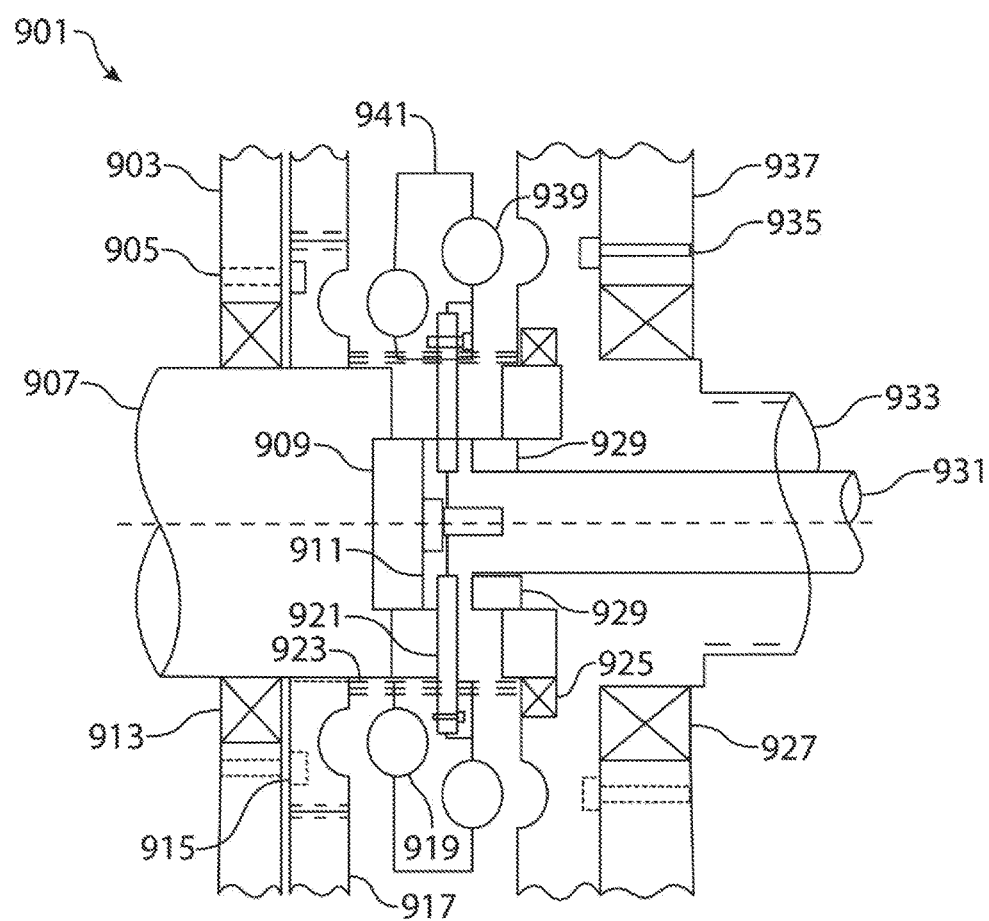
FIG. 24 is an illustration of a two-speed clutch mechanism.

FIG. 24 is an illustration of an embodiment of a two-speed clutch mechanism 901 in accordance with the teachings herein. The clutch mechanism 901 comprises a first backbone 903, a speed magnet sensor 905, a motor input shaft 907, clamping magnetics 909, an end cap 911, a motor bearing 913, an input 915, a first amplifier gear 917, clutch balls (input) 919, a push rod spoke 921, a clutch 923, a pinion support bearing 925, a second stage bearing 927, a clamping magnet 929, a clutch push rod 931, a second stage pinion 933, a magnet 935, a second stage backbone 937, clutch balls (final gear) 939, and a clutch disk 941.

Figure 25:
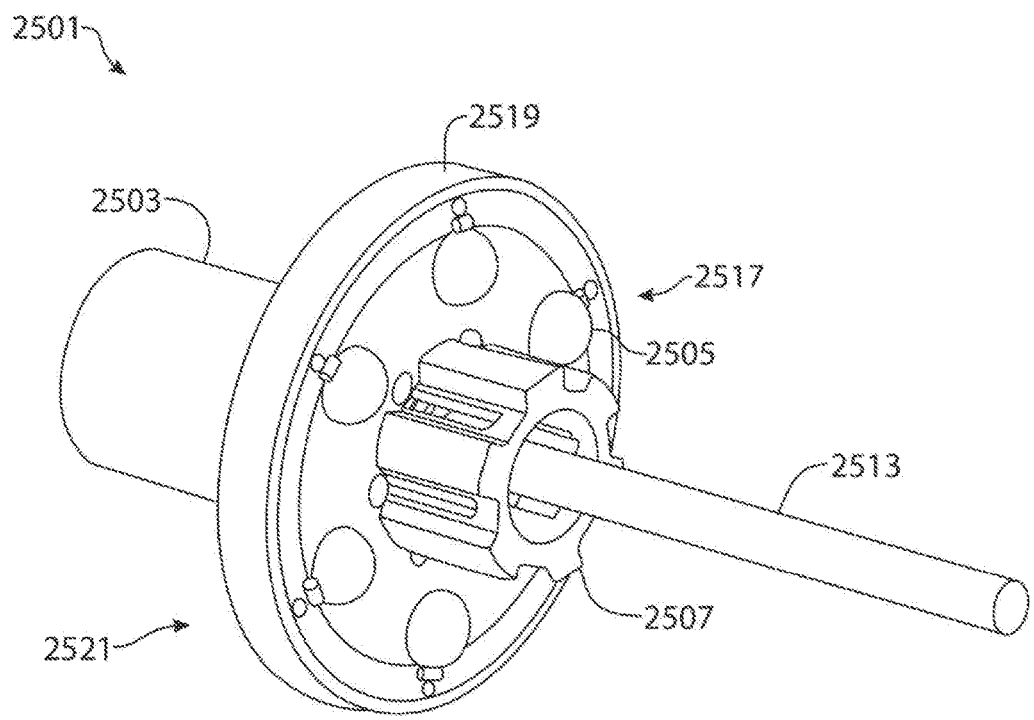
FIG. 25 is an illustration of a clutch configuration.
Figure 26:
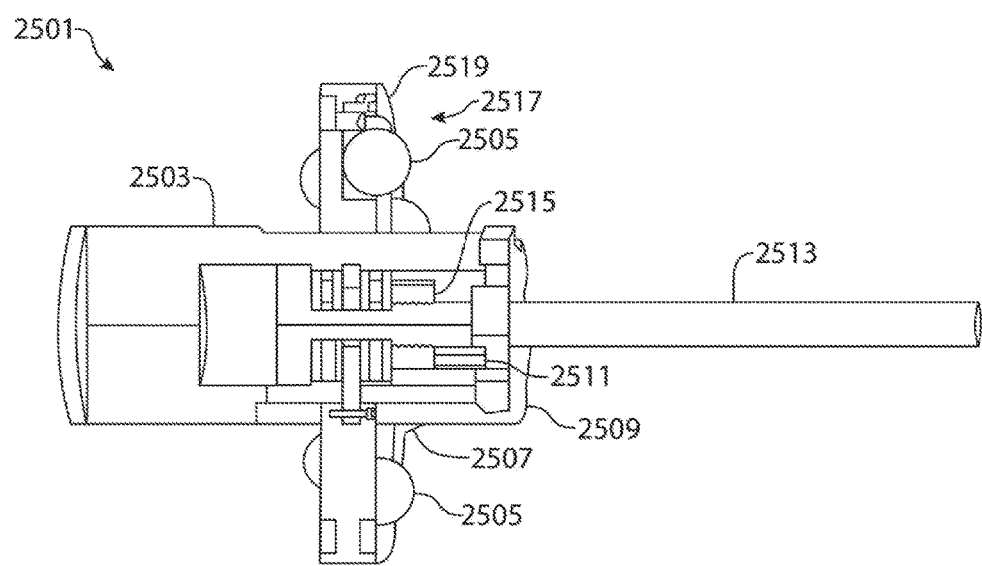
FIG. 26 is an illustration, partially in section, of the clutch configuration of FIG. 25.

FIGS. 25-26 are illustrations of a two-speed clutch mechanism 2501 in accordance with the teachings herein. The clutch mechanism 2501 comprises a motor input 2503, clutch balls 2505, a spoke 2507, a clutch spline 2509, a push rod nut 2511, a clutch push 2513, a thrust needle 2515, a ring cage 2517, a rind 2519, and a clutch ball assembly 2521.

Figure 27:
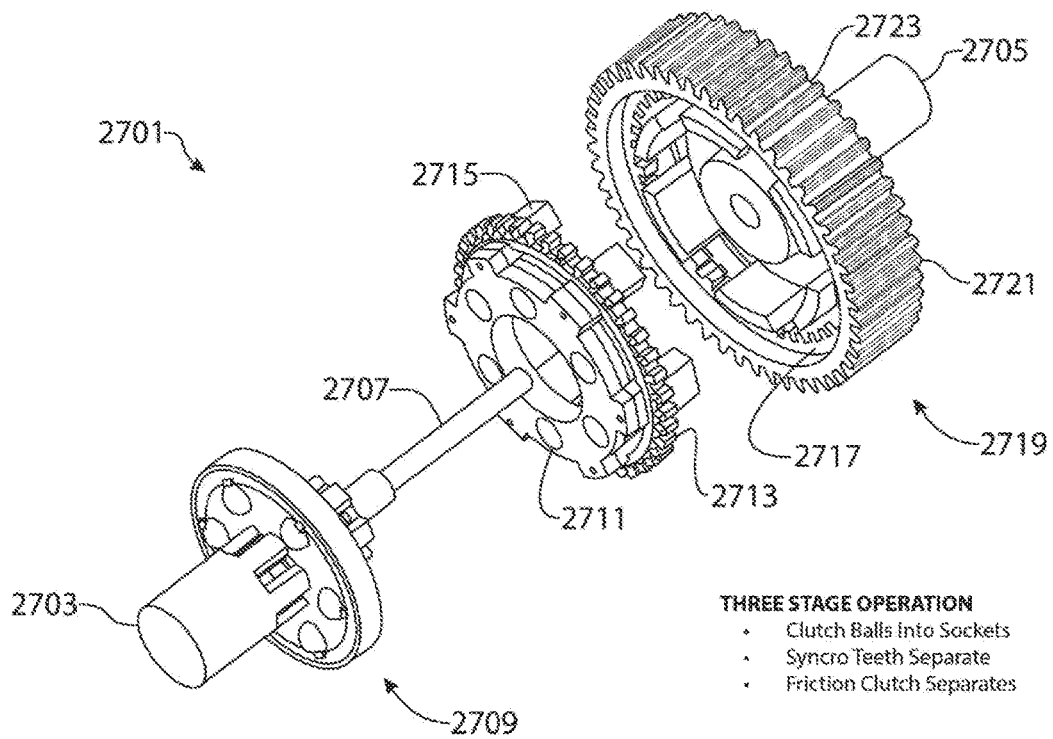
FIG. 27 is an exploded view illustration of a freewheeling output rim gear.

FIG. 27 is an exploded view illustration of an embodiment of a freewheeling output rim gear 2701 in accordance with the teachings herein. The rim gear 2701 comprises an input shaft 2703, an output shaft 2705, a clutch control rod 2707, a ball clutch assembly 2709, gear ball sockets 2711, external synchro teeth 2713, push bars 2715, internal synchro teeth 2717, a front-end output gear 2719, gear teeth 2721, and a gear rim 2723.

Figure 28:
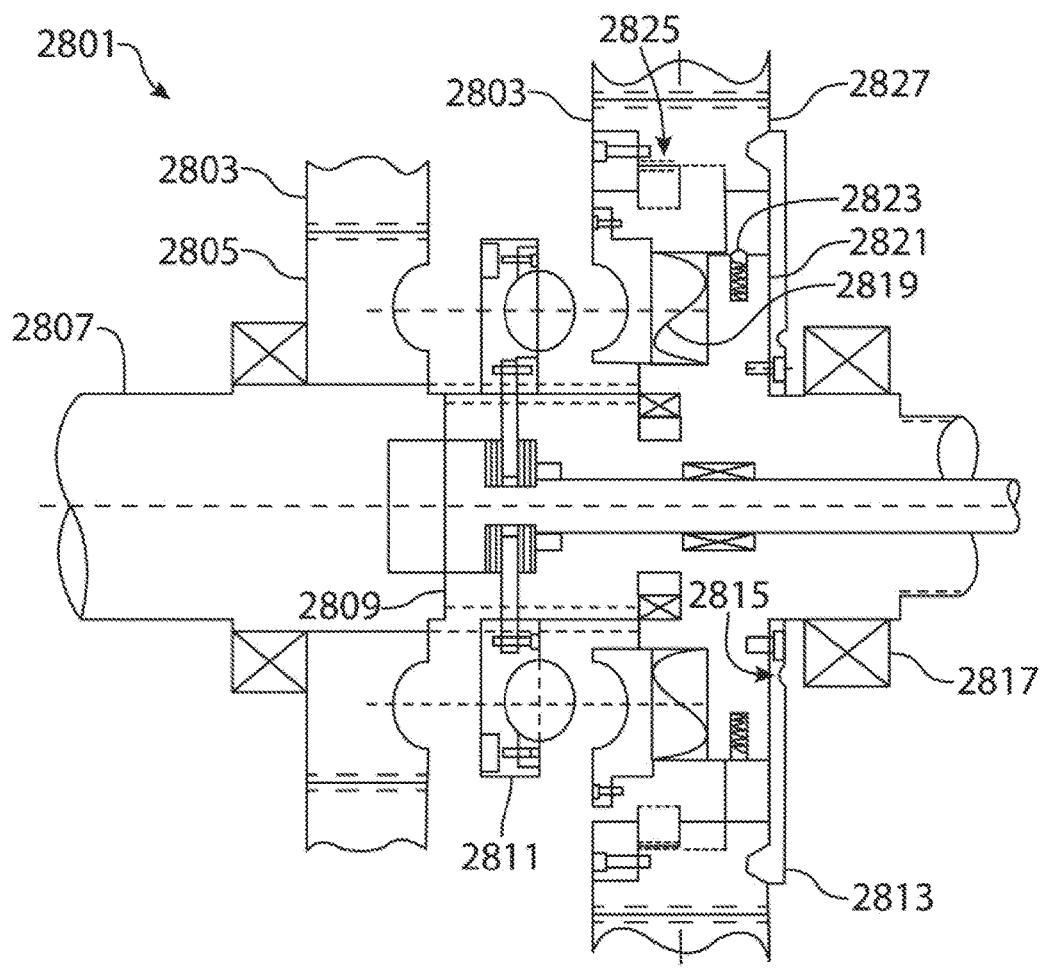
FIG. 28 is an illustration of a freewheeling front amplifier gear design.

FIG. 28 is an illustration of an embodiment of a design of a freewheeling front amplifier gear 2801 in accordance with the teachings herein. The amplifier gear 2801 comprises amplifier gears 2803, a front-end pinion 2805, an input shaft 2807, a clutch spline 2809, a ball clutch disk 2811, a synchro friction clutch 2813, a deformation notch 2815, a gear support bearing 2817, a wave spring 2819, a front-end gear 2821, a lock pin 2123, synchro teeth 2825, and a ring gear 2827.

FIG. 29 is an illustration of an embodiment of a dual synchro 2901 for an MDW star compound front end in accordance with the teachings herein. The dual synchro 2901 comprises a shell frame 2903, a left face gear 2905, dual friction cones 2907, a drive spline 2909, an alignment bearing 2911, a right face gear 2913, a shell frame 2915, a shift disk 2917, and a clutch 2919 equipped with a yoke.

FIG. 30 is an illustration of an embodiment of a simplified two-speed reducer 3001 for an MDW in accordance with the teachings herein. The reducer 3001 comprises a clutched ring gear 3003, a motor input 3005, an output 3007, and a clutched cage 3009.

FIG. 31 is an illustration of an embodiment of a structured design of a simplified reducer 1501 for an MDW in accordance with the teachings herein. The simplified reducer 1501 comprises a shell frame 1503, a gear ring 1505, an alignment bearing 1507, a cage 1509, a face gear 1511, and friction cones 1515.

FIG. 32 is an illustration of an embodiment of a dual synchro/switch actuator 3201 for an MDW in accordance with the teachings herein. The actuator 3201 comprises a ring face gear 3203, a stationary face gear 3205, a spline 3207, a ring gear 3209, a cage 3211, a spline 3213, a stationary face gear 3215, a cage face gear 3217, an actuator shell 3219, a clutch switch actuator 3251, a stator 3253, a rotor 3255, a cylinder screw 3257, a spline 3259, and an actuator shell 3261.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A multi-speed hub drive wheel, comprising:
a wheel equipped with a hub;
a star compound gear train having first and second stages;
a motor disposed in said hub which drives said wheel by way of said star compound gear train; and
a clutch which switches the hub drive wheel between a first mode of operation in which the motor engages the first stage of the star compound gear train, and a second mode of operation in which the motor engages the second stage of the star compound gear train.

2. The multi-speed hub drive wheel of claim 1, wherein said clutch switches the hub drive wheel between said first and second modes of operation, and a third mode of operation in which the motor does not engage the first or second stages of the star compound gear train.

3. The multi-speed hub drive wheel of claim 1, wherein the first stage of the star compound gear train is equipped with a first pinion, wherein the second stage of the star compound gear train is equipped with a second pinion, wherein said motor engages the first stage of the star compound gear train by way of said first pinion, and wherein said motor engages the second stage of the star compound gear train by way of said second pinion.

4. The multi-speed hub drive wheel of claim 1, wherein said motor is a switched reluctance motor.

5. The multi-speed hub drive wheel of claim 4, wherein said motor is driven by a reconfigurable inverter to provide first and second operating regimes.

6. The multi-speed hub drive wheel of claim 1, wherein said gear train comprises a plurality of gears, and wherein said plurality of gears are always in mesh.

7. The multi-speed hub drive wheel of claim 6, wherein said plurality of gears are concentric about a central axis.

8. The multi-speed hub drive wheel of claim 7, wherein the gear forces generated by said gear train are symmetric about said central axis.

9. The multi-speed hub drive wheel of claim 1, wherein the star compound gear train further comprises:
an output gear; and
a plurality of amplifier gears which drive said output gear.

10. The multi-speed hub drive wheel of claim 1, wherein said star compound gear train comprises a plurality of bearings, and wherein each of said plurality of bearings is held in a rigid, non-moving structure.

11. The multi-speed hub drive wheel of claim 1, wherein said gear train further comprises:
a plurality of suspension arm attachments;
a cross roller bearing; and
an output plate.

12. The multi-speed hub drive wheel of claim 11, wherein the gear train has a main force path which extends through said suspension arm attachments, said cross roller bearing and said output plate.

13. The multi-speed hub drive wheel of claim 1, wherein said clutch includes a clutch disk which is driven by said motor.

14. The multi-speed hub drive wheel of claim 13, wherein said first stage of said star compound gear train includes a first pinion, wherein said second stage of said star compound gear train includes a second pinion, wherein said clutch disk engages said first pinion when the hub drive wheel is in said first mode of operation, and wherein said clutch disk engages said second pinion when the hub drive wheel is in said second mode of operation.

15. The multi-speed hub drive wheel of claim 14, wherein said first stage of said star compound gear train is equipped with a first ball seat, and wherein said second stage of said star compound gear train is equipped with a second ball seat.

16. The multi-speed hub drive wheel of claim 15, wherein said clutch disk is equipped with at least one ball which engages said first ball seat when the hub drive wheel is in said first mode of operation, and which engages said second ball seat when the hub drive wheel is in said second mode of operation.

17. The multi-speed hub drive wheel of claim 16, wherein said first and second pinions are characterized by a rotational speed, and further comprising a magnetic pulse sensor which monitors the rotational speeds of the first and second pinions.

18. The multi-speed hub drive wheel of claim 17, wherein the motor is characterized by a rotational speed, and further comprising a controller which (a) synchronizes the rotational speed of the motor with the rotational speed of the first pinion when the clutch disk engages the first pinion, and (b) synchronizes the rotational speed of the motor with the rotational speed of the second pinion when the clutch disk engages the second pinion.

19. The multi-speed hub drive wheel of claim 1, wherein said gear train provides a 49-to-1 gear reduction when the hub drive wheel is in said first mode of operation.

20. The multi-speed hub drive wheel of claim 1, wherein said gear train provides a 14-to-1 gear reduction when the hub drive wheel is in said second mode of operation.

* * * * *